(12) United States Patent
Nakashima

(10) Patent No.: US 8,446,648 B2
(45) Date of Patent: May 21, 2013

(54) IMAGE READING APPARATUS AND IMAGE FORMING APPARATUS INCLUDING THE SAME

(75) Inventor: Noritomo Nakashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 277 days.

(21) Appl. No.: 12/916,689

(22) Filed: Nov. 1, 2010

(65) Prior Publication Data

US 2011/0102863 A1 May 5, 2011

(30) Foreign Application Priority Data

Nov. 4, 2009 (JP) ................................. 2009-253281

(51) Int. Cl.
*H04N 1/04* (2006.01)
*H04N 1/407* (2006.01)

(52) U.S. Cl.
USPC ........................ 358/475; 358/3.26; 358/3.27

(58) Field of Classification Search
USPC .............. 358/474, 475, 1.15, 3.26, 3.27, 505, 358/509, 514, 523, 530
See application file for complete search history.

(56) References Cited

U.S. PATENT DOCUMENTS

| | | | | |
|---|---|---|---|---|
| 5,362,958 | A * | 11/1994 | Ando | 250/208.1 |
| 2003/0090555 | A1 * | 5/2003 | Tatsumi | 347/101 |
| 2005/0052540 | A1 * | 3/2005 | Nakami | 348/222.1 |
| 2005/0088509 | A1 * | 4/2005 | Ohkubo | 347/236 |
| 2008/0231918 | A1 * | 9/2008 | Nagase | 358/483 |
| 2010/0157370 | A1 * | 6/2010 | Kuboki | 358/1.15 |
| 2010/0220370 | A1 * | 9/2010 | Ueno et al. | 358/475 |
| 2011/0095210 | A1 * | 4/2011 | Hwang et al. | 250/578.1 |

FOREIGN PATENT DOCUMENTS

| | | |
|---|---|---|
| JP | 61-179664 | 8/1986 |
| JP | 62-133860 | 6/1987 |
| JP | 63-292763 | 11/1988 |
| JP | 9-259253 | 10/1997 |
| JP | 2007-081696 | 3/2007 |
| JP | 2007-166065 | 6/2007 |

\* cited by examiner

*Primary Examiner* — Jerome Grant, II
(74) *Attorney, Agent, or Firm* — Renner, Otto, Boisselle & Sklar, LLP

(57) ABSTRACT

In one embodiment, an image reading apparatus has a light source configured with a plurality of light-emitting elements disposed in a row in a main scanning direction that irradiate light toward an original, and a photoelectric conversion element that receives light reflected from the original, an output light amount from the light-emitting elements can be adjusted, and a state of bright spots due to repetition of light-dark in the main scanning direction on a light irradiation face of the original due to the plurality of light-emitting elements is determined, and the output light amount from the light-emitting elements is adjusted based on the determination result of the state of the bright spots.

16 Claims, 15 Drawing Sheets slope $K = (Lmax - Lmin) / N$
unevenness[%] $M = (Lmax - Lmin) / Lavg$

IMAGE READING APPARATUS AND IMAGE FORMING APPARATUS INCLUDING THE SAME

CROSS-REFERENCE TO RELATED APPLICATIONS

This application claims priority under 35 U.S.C. §119(a) on Patent Application No. 2009-253281 filed in Japan on Nov. 4, 2009, the entire contents of which are herein incorporated by reference.

BACKGROUND OF THE INVENTION

1. Field of the Invention

The present invention relates to an image reading apparatus in which light from a light source configured with a plurality of light-emitting elements disposed in a row in a main scanning direction is irradiated toward an original, and light reflected from the original is read with a photoelectric conversion element, and also relates to an image forming apparatus provided with this image reading apparatus.

2. Description of the Related Art

In an image reading apparatus provided in an image forming apparatus such as a copy device, facsimile apparatus, or digital multifunction device, or an image reading apparatus capable of connection to a computer via a communications means such as a network, light reflected from an original that has been illuminated by a light source is read as an original image.

As an image reading apparatus, ordinarily, an image reading apparatus employing a moving original reading method in which an original is moved in order to read an original image, or an image reading apparatus employing a stationary original reading method in which an original is fixed in order to read an original image, is adopted.

More specifically, in an image reading apparatus employing the moving original reading method, an image of an original transported to one side in a sub-scanning direction is read while scanning is performed in a main scanning direction orthogonal to the sub-scanning direction using a light source that is positioned at a reading position, via a first light-transmitting plate (for example, an original reading glass). In an image reading apparatus employing the stationary original reading method, an image of an original placed on a second light-transmitting plate (for example, an original stage glass) is read while scanning is performed in the main scanning direction using a light source that moves to one side in the sub-scanning direction.

In a common configuration, a conventional image reading apparatus includes a light source unit in which a light source that illuminates an original and a first mirror are disposed, a second and a third mirror, an imaging lens, and a reducing-type image sensor such as a CCD (Charge Coupled Device) that operates as a photoelectric conversion element, and an original image is read by forming reflected light of an original that has been illuminated by the light source as an image on the image sensor from the first mirror, the second mirror, and the third mirror via the imaging lens. In another common configuration, a conventional image reading apparatus includes a light source that illuminates an original, and a contact image sensor (CIS) or the like that operates as a photoelectric conversion element, and an original image is read by reflected light of an original that has been illuminated by the light source being incident on the image sensor.

Incidentally, as the light source provided in the image reading apparatus, in some cases a light source is adopted in which a plurality of light-emitting elements are disposed in a row in the main scanning direction. Because ordinarily commercially available light-emitting elements such as light-emitting diodes (LEDs) are not supplied so as to each have the same level of luminance of emitted light, but rather have some range of luminance, ordinarily such LEDs are given a unique luminance rank according to their luminance level.

Also, when a light source in which a plurality of light-emitting elements are disposed in a row in the main scanning direction is adopted as the light source provided in an image reading apparatus, because light-emitting elements such as LEDs have directional properties that are stronger in one direction, bright spots occur on the light irradiation face of the original, and these bright spots on the light irradiation face of the original may cause uneven illuminance.

Therefore, conventionally, the image reading apparatus is designed such that uneven illuminance due to the bright spots does not occur, by specifying a luminance rank for the light-emitting elements in a range that there are no bright spot effects, or by increasing the number of mounted light-emitting elements in order to reduce the pitch of the light-emitting elements.

However, limiting the light-emitting elements by specifying a luminance rank or increasing the number of mounted light-emitting elements so that uneven illuminance due to the bright spots does not occur results in increased cost.

As a conventional image reading apparatus, there is an image reading apparatus in which in order to eliminate uneven concentration due to variation in the performance of light-emitting elements and thus prevent worsened image quality, the light amount is decreased for light-emitting elements that emit reflected light received by a light-receiving element for which the level of an output electrical signal is at least a predetermined level greater than the level of an electrical signal output by at least one of other light-receiving elements, or, in a case where there is a light-receiving element that outputs an electrical signal that is at least a predetermined level lower than a predetermined reference level, the light amount is decreased for light-emitting elements that emit the reflected light that is received by light-receiving elements other than that light-receiving element (see JP 2007-166065A).

However, with the image reading apparatus described in JP 2007-166065A, even assuming that it is possible to eliminate uneven concentration due to variation in the performance of individual light-emitting elements, it is not possible to reduce uneven illuminance due to bright spots on the light irradiation face of an original.

SUMMARY OF THE INVENTION

It is an object of the present invention to provide an image reading apparatus, and an image forming apparatus provided with this image reading apparatus, in which light from a light source configured with a plurality of light-emitting elements disposed in a row in a main scanning direction is irradiated toward an original, and light reflected from the original is read with a photoelectric conversion element, in which without leading to high cost, it is possible to reduce bright spots on a light irradiation face of the original, and thus it is possible to suppress uneven illuminance due to the bright spots.

In light-emitting elements such as light-emitting diodes (LEDs) that have directional properties stronger in one direction, with respect to these directional properties, the size of the output light amount (that is, illuminance at the light irradiation face of an original) can affect the state of the bright spots on the light irradiation face of the original. For example, as the output light amount from the light-emitting elements decreases, bright spots are less likely to occur on the light irradiation face of the original, and so there is a tendency for uneven illuminance due to the bright spots on the light irradiation face of the original to be mitigated.

The present invention utilizes the above directional properties, and provides an image reading apparatus having a light source configured with a plurality of light-emitting elements disposed in a row in a main scanning direction that irradiate light toward an original, and a photoelectric conversion element that receives light reflected from the original, in which an output light amount from the light-emitting elements can be adjusted, and a state of bright spots due to repetition of light-dark in the main scanning direction on a light irradiation face of the original due to the plurality of light-emitting elements is determined, and the output light amount from the light-emitting elements is adjusted based on the determination result of the state of the bright spots.

The present invention also provides an image forming apparatus having the image reading apparatus according to the present invention.

According to the image reading apparatus and the image forming apparatus according to the present invention, the output light amount from the light-emitting elements is adjusted based on the determination result of the state of the bright spots on the light irradiation face of the original, so it is possible to decrease bright spots, and thus it is possible to suppress uneven illuminance due to the bright spots, without specifying a luminance rank for the light-emitting elements in a range where there will be no bright spot effects or increasing the number of mounted light-emitting elements as in the conventional technology, that is, without resulting in increased cost.

In an example embodiment of the present invention, the output light amount from the light-emitting elements is decreased when determined from the determination result that the bright spots occur.

In this embodiment, the output light amount from the light-emitting elements is decreased when determined from the determination result that the bright spots occur, so bright spots can be made less likely to occur on the light irradiation face of the original, and thus it is possible to suppress uneven illuminance due to the bright spots.

In the present invention, it is preferable that an amplification degree of a signal from the photoelectric conversion element is adjustable, and the amplification degree is increased to an extent that the output light amount is decreased.

In this embodiment, not only is it possible to suppress uneven illuminance due to the bright spots on the light irradiation face of the original, but as necessary, by increasing the amplification degree to the extent that the output light amount is decreased, it is possible to easily compensate for inadequate strength of the signal from the photoelectric conversion element due to a decrease in the output light amount.

In an example embodiment of the present invention, light is irradiated from the light-emitting elements to a reference image for detecting the state of the bright spots on the light irradiation face of the original, reflected light reflected from the reference image is read by the photoelectric conversion element, a calculated value for determining the state of the bright spots is calculated from the read value read by the photoelectric conversion element, and the calculated value is compared to a set value that has been set in advance to determine the state of the bright spots on the light irradiation face of the original.

In this embodiment, a reference image for detecting the state of the bright spots is read by the photoelectric conversion element, a calculated value for determining the state of the bright spots is calculated from the read value read by the photoelectric conversion element, and the calculated value is compared to a set value that has been set in advance to determine the state of the bright spots on the light irradiation face of the original, so the determination can easily be performed.

In the present invention, a white reference member for shading correction may be read for the reference image, or a gray chart may be read for the reference image.

In this embodiment, by reading the white reference member or the gray chart for the reference image, it is possible to precisely detect the state of the bright spots on the light irradiation face of the original. In consideration of the fact that the degree of unevenness of an image that has been read with the gray chart will be larger than the degree of unevenness of an image that has been read with the white reference member, it is preferable to read the gray chart for the reference image.

In the present invention, it is preferable that the calculated value is calculated based on a maximum value and a minimum value of illuminance in an illuminance cycle that indicates repetition of light-dark in the main scanning direction on the light irradiation face of the original due to the plurality of light-emitting elements.

In this embodiment, it is possible to easily calculate the state of the bright spots from the maximum value and the minimum value of illuminance in the illuminance cycle.

For example, the calculated value may be calculated from a change rate (slope) of an illuminance difference versus distance in the main scanning direction in the illuminance cycle. More specifically, the calculated value can be set to a value calculated by below Formula (1), where the maximum value of illuminance in the illuminance cycle is Lmax, the minimum value is Lmin, and a distance between the maximum value Lmax and the minimum value Lmin in the main scanning direction is N.

$$(L\max - L\min)/N \qquad \text{Formula (1)}$$

In this embodiment, it is possible to easily calculate the calculated value by calculating the slope as the calculated value.

The calculated value may also be calculated from a change rate (unevenness [%]) of an illuminance difference versus an average value of illuminance in the illuminance cycle. More specifically, the calculated value can be set to a value calculated by below Formula (2), where the maximum value of illuminance in the illuminance cycle is Lmax, the minimum value is Lmin, and an average value of the maximum value Lmax and the minimum value Lmin is Lavg.

$$(L\max - L\min)/L\text{avg} \qquad \text{Formula (2)}$$

In this embodiment, it is possible to easily calculate the calculated value by calculating the unevenness [%] as the calculated value.

In an example embodiment of the present invention, the output light amount from the plurality of light-emitting elements can be separately adjusted for each light-emitting element, the state of the bright spots on the light irradiation face of the original is determined for each light-emitting element, and the output light amount from the plurality of light-emitting elements is separately adjusted for each light-emitting element based on the determination result of the state of the bright spots.

In this embodiment, the output light amount from the plurality of light-emitting elements is separately adjusted for each light-emitting element based on the determination result, so bright spots can be decreased according to the output light amount from the individual light-emitting elements, and to that extent it is possible to reliably suppress uneven illuminance due to the bright spots.

In an example embodiment of the image reading apparatus according to the present invention, the image reading apparatus may also be a reducing optical system-type image reading apparatus that has a plurality of mirrors and a lens, in which reading is performed by the mirrors guiding reflected light from an original to the lens, and the lens forming a reduced image on a lens reducing image sensor that operates as a photoelectric conversion element. A solid-state image sensor such as a charge-coupled device (CCD) can be used, for example, as the photoelectric conversion element used in a reducing optical system-type image reading apparatus.

The image reading apparatus according to the present invention may also be an equal-magnification optical system-type image reading apparatus provided with a lens array, in which the lens array is near the original, and reading is performed by the lens array forming reflected light from the original as an equal-magnification image on a contact image sensor (CIS) that operates as a photoelectric conversion element.

As described above, according to the present invention, the output light amount from the light-emitting elements is adjusted based on the determination result of the state of the bright spots on the light irradiation face of the original, so it is possible to decrease bright spots, and thus it is possible to suppress uneven illuminance due to the bright spots, without specifying a luminance rank for the light-emitting elements in a range where there will be no bright spot effects or increasing the number of mounted light-emitting elements as in the conventional technology, that is, without resulting in increased cost.

BRIEF DESCRIPTION OF THE DRAWINGS

FIG. 3A is a perspective view thereof, and FIG. 3B is an exploded perspective view thereof.

FIG. 4A is a side view of the light source unit, and FIG. 4B is a side view of the light source.

FIG. 7A shows an example in which first light-emitting elements and second light-emitting elements disposed in a row on both sides perform top light emission, and FIG. 7B shows an example in which light-emitting elements disposed in a row on only one side perform top light emission.

DESCRIPTION OF THE PREFERRED EMBODIMENTS

Hereinafter, an embodiment(s) of the present invention will be described with reference to the drawings. The embodiment(s) below are specific examples of the present invention, and are not of a nature limiting the technical scope of the present invention.

Figure 1:
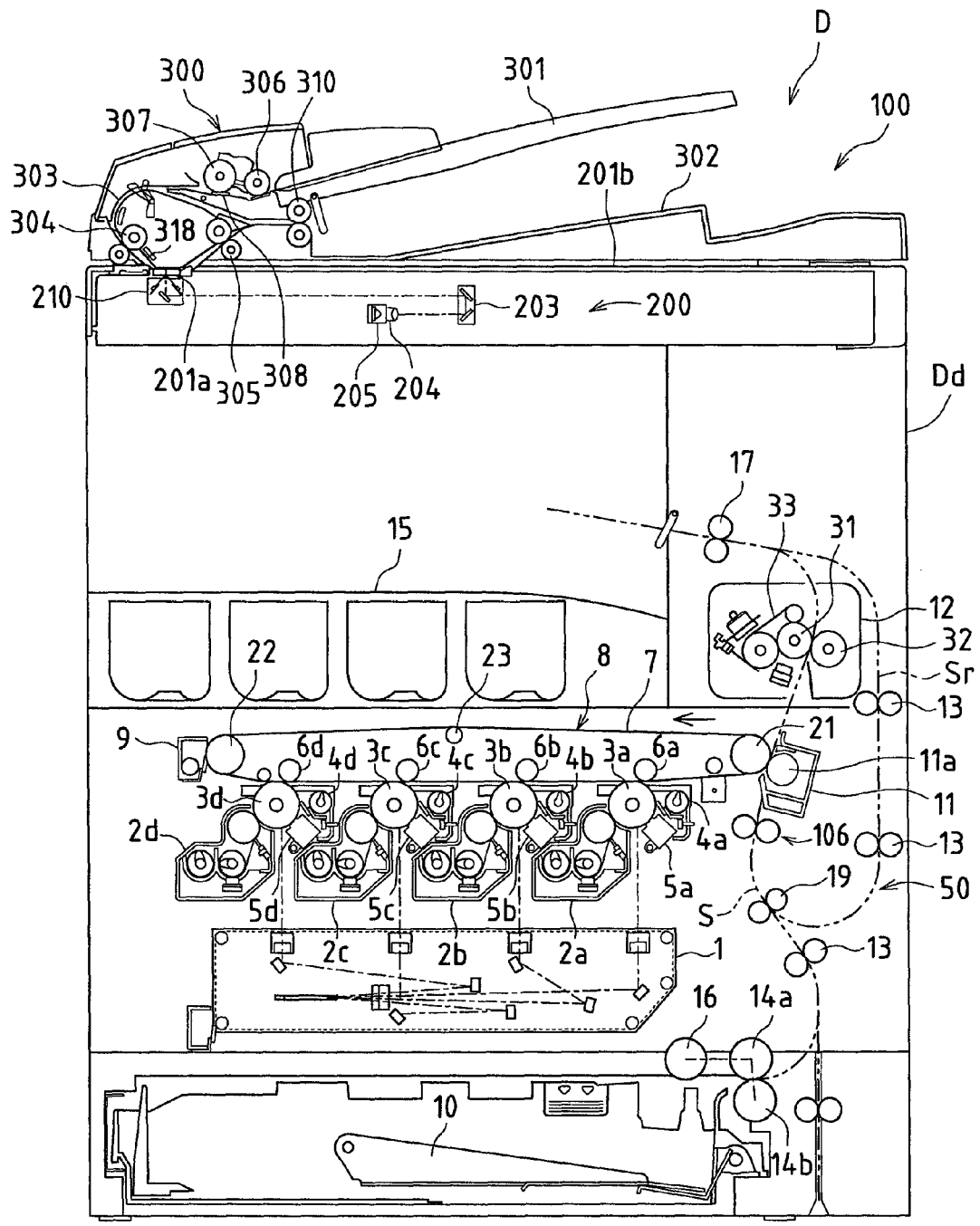
FIG. 1 is a cross-sectional view that schematically shows an image forming apparatus provided with an image reading apparatus according to an embodiment of the present invention.

FIG. 1 is a cross-sectional view that schematically shows an image forming apparatus D provided with an image reading apparatus 100 according to an embodiment of the present invention.

The image forming apparatus D shown in FIG. 1 is provided with the image reading apparatus 100 that reads an image of an original G (see FIG. 2 and so forth described below), and an apparatus main body Dd that forms an image of the original G that has been read by the image reading apparatus 100 or an image that has been received from outside by recording the image in color or monochrome to ordinary paper or the like.

[Overall Configuration of Image Forming Apparatus]

The apparatus main body Dd of the image forming apparatus D is provided with an exposing apparatus 1, development apparatuses 2 (2a, 2b, 2c, and 2d), photosensitive drums 3 (3a, 3b, 3c, and 3d) that operate as image carriers, charging units 5 (5a, 5b, 5c, and 5d), cleaner apparatuses 4 (4a, 4b, 4c, and 4d), an intermediate transfer belt apparatus 8 that includes intermediate transfer rollers 6 (6a, 6b, 6c, and 6d) that operate as a transfer unit, a fixing apparatus 12, a sheet transport apparatus 50, a paper feed tray 10 that operates as a paper feed unit, and a discharge tray 15 that operates as a discharge unit.

Image data handled in the apparatus main body Dd of the image forming apparatus D corresponds to a color image employing each of the colors black (K), cyan (C), magenta (M), and yellow (Y), or corresponds to a monochrome image employing a single color (for example, black). Accordingly, four each of the development apparatuses 2 (2a, 2b, 2c, and 2d), the photosensitive drums 3 (3a, 3b, 3c, and 3d), the charging units 5 (5a, 5b, 5c, and 5d), the cleaner apparatuses 4 (4a, 4b, 4c, and 4d), and the intermediate transfer rollers 6 (6a, 6b, 6c, and 6d) are provided such that four types of images corresponding to each color are formed. Among the four suffix letters a to d, a is associated with black, b is associated with cyan, c is associated with magenta, and d is associated with yellow. In this way, four image stations are configured. In the description below, the suffix letters a to d are omitted.

The photosensitive drum 3 is disposed in approximately the center in the vertical direction of the apparatus main body Dd. The charging unit 5 is a charging means for uniformly charging the surface of the photosensitive drum 3 to a predetermined potential, and a roller-type or a brush-type charging unit, which are contact-type charging units, or otherwise a charger-type charging unit, is used in the charging unit 5.

Here, the exposing apparatus 1 is a laser scanning unit (LSU) provided with a laser diode and a reflecting mirror, exposes the charged surface of the photosensitive drum 3 corresponding to the image data, and forms an electrostatic latent image corresponding to the image data on that surface.

The development apparatus 2 uses (K, C, M, Y) toner to develop the electrostatic latent image formed on the photosensitive drum 3. The cleaner apparatus 4 removes and recovers toner remaining on the surface of the photosensitive drum 3 after development and image transfer.

The intermediate transfer belt apparatus 8 disposed above the photosensitive drum 3, in addition to the intermediate transfer roller 6, is provided with an intermediate transfer belt 7, an intermediate transfer belt drive roller 21, an idler roller 22, a tension roller 23, and an intermediate transfer belt cleaning apparatus 9.

Roller members such as the intermediate transfer belt drive roller 21, the intermediate transfer roller 6, the idler roller 22, and the tension roller 23 support the intermediate transfer belt 7, which is stretched across those roller members, and the intermediate transfer belt 7 is moved around the roller members in a predetermined transport direction (the direction of the arrow in FIG. 1).

The intermediate transfer roller 6 is rotatably supported inside of the intermediate transfer belt 7, and is pressed against the photosensitive drum 3 via the intermediate transfer belt 7.

The intermediate transfer belt 7 is provided so as to contact each photosensitive drum 3, and forms a color toner image (toner images of each color) by successively transferring in a stacked manner the toner image of the surface of each photosensitive drum 3 to the intermediate transfer belt 7. Here, the intermediate transfer belt 7 is formed as an endless belt using a film having a thickness of about 100 to 150 μm.

Transfer of a toner image from the photosensitive drum 3 to the intermediate transfer belt 7 is performed by the intermediate transfer roller 6, which is pressing against the inside (back face) of the intermediate transfer belt 7. A high voltage transfer bias (for example, a high voltage of opposite polarity (+) as the toner charging polarity (−)) is applied to the intermediate transfer roller 6 in order to transfer a toner image. Here, the intermediate transfer roller 6 is a roller having a metal (for example, stainless steel) shaft of diameter 8 to 10 mm as a base, with the surface of that shaft covered by a conductive elastic material (for example, such as EPDM or urethane foam). By using this conductive elastic material, a high voltage can be uniformly applied to the intermediate transfer belt 7.

The apparatus main body Dd of the image forming apparatus D is further provided with a secondary transfer apparatus 11 that includes a transfer roller 11a that operates as a transfer unit. The transfer roller 11a is in contact with the opposite side (outside) of the intermediate transfer belt 7 as the intermediate transfer belt drive roller 21.

As described above, the toner image on the surface of each photosensitive drum 3 is stacked on the intermediate transfer belt 7, and these toner images become the full-color toner image expressed by the image data. The toner images of each color stacked in this way are transported along with the intermediate transfer belt 7, and transferred onto a recording sheet by the secondary transfer apparatus 11.

The intermediate transfer belt 7 and the transfer roller 11a of the secondary transfer apparatus 11 press against each other, thereby forming a nip region. A voltage (for example, a high voltage of opposite polarity (+) as the toner charging polarity (−)) is applied to the transfer roller 11a of the secondary transfer apparatus 11 in order to transfer the toner images of each color on the intermediate transfer belt 7 to the recording sheet. Furthermore, in order to steadily obtain that nip region, either the transfer roller 11a of the secondary transfer apparatus 11 or the intermediate transfer belt drive roller 21 is made of a hard material (such as metal), and the other is made of a soft material such as an elastic roller (such as an elastic rubber roller or a foam resin roller).

Toner may remain on the intermediate transfer belt 7, without the toner image on the intermediate transfer belt 7 being completely transferred onto the recording sheet by the secondary transfer apparatus 11. This remaining toner causes toner color mixing to occur in the next step, and therefore the remaining toner is removed and collected by the intermediate transfer belt cleaning apparatus 9. The intermediate transfer belt cleaning apparatus 9 is provided with a cleaning blade that contacts the intermediate transfer belt 7 as a cleaning member, for example, and the remaining toner can be removed and collected by the cleaning blade. The idler roller 22 supports the intermediate transfer belt 7 from the inside (back side), and the cleaning blade contacts the intermediate transfer belt 7 such that the cleaning blade presses from the outside toward the idler roller 22.

The paper feed tray 10 is a tray for storing recording sheets, and is provided on the lower side of an image forming unit of the apparatus main body Dd. The discharge tray 15 provided on the upper side of the image forming unit is a tray for placing printed recording sheets face-down.

The apparatus main body Dd is provided with the sheet transport apparatus 50 for feeding recording sheets of the paper feed tray 10 through the secondary transfer apparatus 11 and the fixing apparatus 12 to the discharge tray 15. The sheet transport apparatus 50 has an S-shaped sheet transport path S, and disposed along the sheet transport path S are transport members such as a pickup roller 16, separation rollers 14a and 14b, transport rollers 13, a pre-registration roller pair 19, a registration roller pair 106, the fixing apparatus 12, a discharge roller 17, and so forth.

The pickup roller 16 is provided at a downstream end in the sheet transport direction of the paper feed tray 10, and is a pickup roller that supplies recording sheets from the paper feed tray 10 page-by-page to the sheet transport path S. The separation roller 14a transports recording sheets between the separation roller 14a and the separation roller 14b and to the sheet transport path S while separating the recording sheets page-by-page. The transport rollers 13 and the pre-registration roller pair 19 are small rollers for promoting/assisting transport of the recording sheets. The transport rollers 13 are provided in a plurality of locations along the sheet transport path S. The pre-registration roller pair 19 is provided in the immediate vicinity of the upstream side in the sheet transport direction of the registration roller pair 106, and transports the recording sheets to the registration roller pair 106.

The registration rollers 106 temporarily stop the recording sheet transported by the pre-registration rollers 19, align the leading edge of the recording sheet, and then transport the recording sheet in a timely manner, in coordination with rotation of the photosensitive drum 3 and the intermediate transfer belt 7, such that the color toner image on the intermediate transfer belt 7 is transferred to the recording sheet in the nip region between the intermediate transfer belt 7 and the secondary transfer apparatus 11.

For example, the registration rollers 106 transport the recording sheet such that the leading edge of the color toner image on the intermediate transfer belt 7 matches the leading edge of an image forming range in the recording sheet in the nip region between the intermediate transfer belt 7 and the secondary transfer apparatus 11.

The fixing apparatus 12 is provided with a heat roller 31 and a pressure roller 32. The heat roller 31 and the pressure roller 32 transport the recording sheet while sandwiching the recording sheet therebetween.

The heat roller 31 is temperature-controlled to become a predetermined fixing temperature, and by applying heat and pressure to the recording sheet along with the pressure roller 32, melts, mixes, and presses against the toner image transferred to the recording sheet, thus thermally fixing the toner image to the recording sheet. Also, an external heating belt 33 for heating the heat roller 31 from outside is provided in the fixing apparatus 12.

After fixing of the toner images of each color, the recording sheet is discharged onto the discharge tray 15 by the discharge roller 17.

It is also possible to form a monochrome image using at least one among the four image forming stations, and transfer the monochrome image to the intermediate transfer belt 7 of the intermediate transfer belt apparatus 8. As in the case of a color image, this monochrome image is transferred from the intermediate transfer belt 7 to a recording sheet, and fixed on the recording sheet.

Also, when image forming is performed not only on the front (back) face of a recording sheet, but rather duplex image forming is performed, after an image for the front face of the recording sheet has been fixed by the fixing apparatus 12, while the recording sheet is being transported by the discharge roller 17 in the sheet transport path S, the discharge roller 17 is stopped and then rotated in reverse, the front and back of the recording sheet are reversed by passing the recording sheet through a front/back reverse path Sr, and then the recording sheet is again guided to the registration roller pair 106, and as in the case of the front face of the recording sheet, an image is recorded to the back face of the recording sheet and fixed, and then the recording sheet is discharged to the discharge tray 15.

[Overall Configuration of Image Reading Apparatus]

Figure 2:
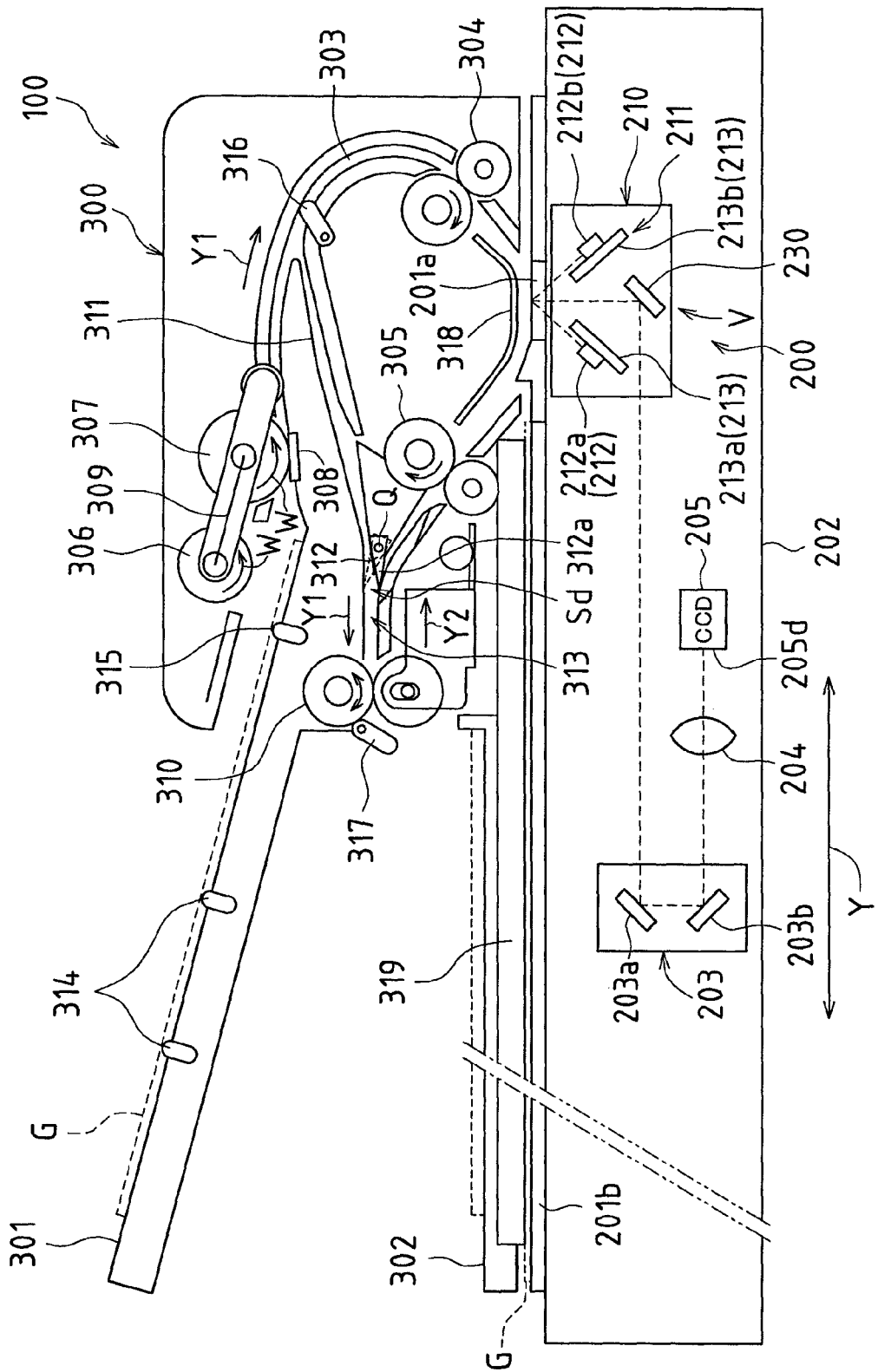
FIG. 2 is a schematic cross-sectional view from behind the image reading apparatus shown in FIG. 1.

FIG. 2 is a schematic cross-sectional view from behind the image reading apparatus 100 shown in FIG. 1. The image reading apparatus 100 shown FIGS. 1 and 2 is configured as a reducing optical system-type image reading apparatus, and is configured to read an original image by moving an original G according to a moving original method, and to read an original image by fixing an original G according to a stationary original method.

That is, the image reading apparatus 100 has a moving original reading configuration (moving original reading function) that executes a moving original reading mode, and also has a stationary original reading configuration (stationary original reading function) that executes a stationary original reading mode.

In the moving original reading configuration, in an automatic original feeding apparatus 300 that automatically transports an original G, the original G is transported to one side in a sub-scanning direction (the direction of arrow Y in FIG. 2) so as to pass over an original reading glass 201a that is an example of a first light-transmitting plate, and while illuminating the original G via the original reading glass 201a by a light source unit 210 positioned at a reading position V in an original reading portion 200, reflected light from the original G illuminated by the light source unit 210 is scanned in a main scanning direction (the direction of arrow X in FIGS. 3A and 3B described below) to read an original image.

In the stationary original reading configuration, while moving the light source unit 210 to one side in the sub-scanning direction Y, an original G placed on a glass platen 201b (original stage glass) that is an example of a second light-transmitting plate is illuminated via the glass platen 201b, and reflected light from the original G illuminated by the light source unit 210 is scanned in the main scanning direction X to read an original image. Note that FIG. 2 shows a state in which the light source unit 210 is positioned at the reading position V.

More specifically, the original reading portion 200 is provided with the glass platen 201b, the light source unit 210 that operates as a scanning body, an optical system drive unit 530 (not shown in FIGS. 1 and 2, but see FIG. 8 described below) that moves the light source unit 210, a mirror unit 203, an imaging lens 204, and a photoelectric conversion element (here, a CCD) 205, and these members are housed in a metal frame body 202. The light source unit 210 has a light source 211 that irradiates light toward the original G, and a first mirror 230 that guides reflected light from the original G to the mirror unit 203. The light source unit 210 will be described in detail later.

The glass platen 201b where the original G is placed is constituted from a light-transmitting glass plate, and both ends of the glass platen 201b in the main scanning direction X are mounted on the frame body 202. The automatic original feeding apparatus 300 is capable of opening/closing relative to the original reading portion 200 around an axis line (for example, being axially supported by a hinge) in the sub-scanning direction Y, and on the lower face of the automatic original feeding apparatus 300 is provided an original pressing member 319 that presses from above an original G that has been placed on the glass platen 201b of the original reading portion 200.

The mirror unit 203 is provided with a second mirror 203a, a third mirror 203b, and a support member (not shown). The support member supports the second mirror 203a such that light from the first mirror 230 in the light source unit 210 is reflected and guided to the third mirror 203b. Also, the support member supports the third mirror 203b such that light from the second mirror 203a is reflected and guided to the imaging lens 204. The imaging lens 204 collects light from the third mirror 203b on a light-receiving face 205d of the photoelectric conversion element 205. The photoelectric conversion element 205 repeatedly scans light (original image light) from the imaging lens 204 in the main scanning direction X, and each time outputs an analog signal of a single scan line.

The optical system drive unit 530, here, is provided with an unshown scanner motor and unshown moving mechanisms such as pulleys and wires, and with the scanner motor and moving mechanisms, is configured to move the light source unit 210 in the sub-scanning direction Y at a constant speed, and also move the mirror unit 203 in the same sub-scanning direction Y at a movement speed that is ½ of the movement speed of the light source unit 210.

Here, the original reading portion 200, in addition to the stationary original method, is also compatible with the moving original method, and is provided with the original reading glass 201a. Accordingly, the optical system drive unit 530 is furthermore configured such that the light source unit 210 is positioned at a predetermined home position V below the original reading glass 201a.

The automatic original feeding apparatus 300 is provided with an original tray 301 where an original G is placed for transport, a discharge tray 302 disposed below the original tray 301, a first transport path 303 connecting between these trays, and two transport roller pairs, including an upstream side transport roller pair 304 and a downstream side transport roller pair 305.

The upstream side transport roller pair 304 transports the original G on the upstream side in a transport direction Y1 of the original G, relative to the original reading glass 201a. The downstream side transport roller pair 305 transports the original G on the downstream side in the transport direction Y1 of the original G, relative to the original reading glass 201a. That is, the upstream side transport roller pair 304, the original reading glass 201a, and the downstream side transport roller pair 305 are disposed in this order in the transport direction Y1. The original reading glass 201a is provided approximately horizontally, so as to define a transport wall of the first transport path 303.

The automatic original feeding apparatus 300 is furthermore provided with a pickup roller 306, a separation roller 307, and a separation member 308 such as a separation pad.

The pickup roller 306 feeds the original G that has been placed on the original tray 301 from the original tray 301 into the first transport path 303 in the transport direction Y1. The separation roller 307 is disposed on the downstream side in the transport direction Y1 relative to the pickup roller 306, and while holding in a sandwiched manner, together with the separation member 308, the original G that has been fed by the pickup roller 306, furthermore transports the original G to the downstream side in the transport direction Y1. The separation member 308 handles (separates) originals G to be transported between the separation roller 307 and the separation member 308 in a state facing the separation roller 307 such that one page of the originals G is transported at a time.

In the automatic original feeding apparatus 300 having this configuration, originals G are transported between the separation roller 307 and the separation member 308 by the pickup roller 306, and here, due to rotational driving of the separation roller 307 along with handling the originals G so as to separate them, the originals G are transported page-by-page. Also, the originals G transported by the separation roller 307 are guided by the first transport path 303 and supplied page-by-page toward the upstream side transport roller pair 304.

Specifically, with an unshown pickup roller drive unit, the pickup roller 306 is made capable of contacting/separating from an original G that has been placed on the original tray 301. The pickup roller 306 is linked to the separation roller 307 so as to rotate in the same direction as the separation roller 307, via a drive transmission means 309 that includes an endless belt or the like. The pickup roller 306 and the separation roller 307 are configured to be rotationally driven by an unshown original supply drive unit in the direction (direction of arrow W in FIG. 2) that transports the original G in the transport direction Y1 when reading of the original G is requested.

In the present embodiment, the automatic original feeding apparatus 300 is configured to, after transporting an original G such that one face of the original G can be read, reverse the original G such that the front and back faces of the original G are reversed, and transport the original G such that the other face of the original G can be read.

More specifically, the automatic original feeding apparatus 300, in addition to having the above configuration, is further provided with a reverse roller pair 310, a second transport path 311, and a switching claw 312.

The first transport path 303 is formed as a loop such that the original G is transported from the separation roller 307 to the discharge tray 302 via the upstream side transport roller pair 304, the original reading glass 201a, the downstream side transport roller pair 305, and the reverse roller pair 310. The reverse roller pair 310 is disposed on the downstream side in the transport direction Y1 relative to the downstream side transport roller pair 305, and serves to transport the original G from the downstream side transport roller pair 305 such that the trailing edge (the edge on the upstream side in the transport direction Y1) becomes the leading edge. The second transport path 311 is branched from a branch portion Sd between the reverse roller pair 310 and the downstream side transport roller pair 305, and in order to reverse the original G that has been transported by the reverse roller pair 310 such that the trailing edge becomes the leading edge so that the front and back faces of the original G are reversed, guides the original G to the upstream side in the transport direction Y1 relative to the upstream side transport roller pair 304 in the first transport path 303. A switchback transport path 313 is formed between the branch portion Sd and the reverse roller pair 310 in the first transport path 303. The switchback transport path 313 is configured as a transport path in which transport of an original G is possible by rotation of the reverse roller pair 310 in the forward direction (original G transport direction Y1), and reverse transport of an original G is possible by rotation in the reverse direction.

The switching claw 312 is disposed in the branch portion Sd, and is configured to be capable of adopting a first switching posture that guides the original G from the reverse roller pair 310 via the second transport path 311 to the upstream side transport roller pair 304, and a second switching posture that guides the original G from the downstream side transport roller pair 305 via the switchback transport path 313 to the reverse roller pair 310.

Here, the switching claw 312, in an ordinary state, is disposed in a state directly linking the switchback transport path 313 and the second transport path 311 (the first switching posture, see the solid line in FIG. 2), and when an original G for which an original image has been read by the original reading portion 200 is to be transported in the transport direction Y1, the leading edge (the edge on the downstream side in the transport direction Y1) of the original G pushes up the switching claw 312 and so the original G is guided to the switchback transport path 313 (the second switching posture, see the broken line in FIG. 2). The switching claw 312 is configured to be capable of swinging around a swinging shaft Q in the axis line direction of the reverse roller pair 310, such that a claw portion 312a drops by its own weight and blocks the first transport path 303 between the downstream side transport roller pair 305 and the reverse roller pair 310 to adopt the first switching posture. When the trailing edge of the original G is positioned in the switchback transport path 313, and the original G is transported in reverse in the reverse transport direction (direction of arrow Y2 in FIG. 2) that is the opposite direction as the transport direction Y1 of the original G by the reverse roller pair 310 that rotates in the reverse direction, the switching claw 312 guides the original G to the second transport path 311.

The size of an original G that has been placed on the original tray 301 is detected by original size sensors 314 disposed in the original placement portion of the original tray 301. The presence of the original G that has been placed on the original tray 301 is detected by an original presence detection sensor 315 disposed near the pickup roller 306 in the original placement portion of the original tray 301. The upstream side transport roller pair 304, in a stopped state, is abutted to adjust the leading edge of an original G that has been transported by the separation rollers 307, and is rotationally driven in coordination with reading timing. The original G thus transported is detected by a transport sensor 316 disposed on the downstream side in the transport direction Y1 of the first transport path 303 relative to the second transport path 311, and on the upstream side relative to the upstream side transport roller pair 304. An original G discharged by the reverse roller pair 310 is detected by a discharge sensor 317 disposed near the reverse roller pair 310 on the discharge side relative to the reverse roller pair 310. The transport system rollers such as the transport roller pairs 304 and 305, the reverse roller pair 310, and so forth are driven by an unshown transport system drive unit.

Also, in the present embodiment, the original reading portion 200 is further provided with a white reference member (here, a white reference plate) 318 for reading when performing shading correction that flattens digital image signal values. Specifically, the white reference member 318 is configured as a reading guide member provided at a position opposing the original reading glass 201a. That is, the white reference member 318 functions also as a reading guide that together with the original reading glass 201a guides the transported original G.

In the above image reading apparatus 100, when there is an instruction to read an original G by the stationary original method, the light source unit 210, while irradiating the original G placed on the glass platen 201b with light via the glass platen 201b, moves to one side in the sub-scanning direction Y at a constant speed to scan an image of the original G, and at the same time the mirror unit 203 moves to one side in the same sub-scanning direction Y at a movement speed that is ½ the movement speed of the light source unit 210.

Reflected light that has been reflected from the original G due to illumination by the light source unit 210 is reflected by the first mirror 230 provided in the light source unit 210, and then 180° light path conversion of that reflected light is performed by the second and third mirrors 203a and 203b of the mirror unit 203. The light that has been reflected from the third mirror 203b forms an image on the light-receiving face 205d of the photoelectric conversion element 205 via the imaging lens 204, and here the light of the original image is read and converted to an analog signal.

On the other hand, when there is an instruction to read an original G by the moving original method, with the light source unit 210 remaining stationary at position V shown in FIG. 2, the original G is transported by the automatic original feeding apparatus 300 to one side in the sub-scanning direction Y so as to pass above position V shown in FIG. 2. That is, originals G that have been placed on the original tray 301 are drawn out by the pickup roller 306, separated page-by-page by the separation roller 307 and the separation member 308, and transported to the first transport path 303. After transport of an original G that has been transported to the first transport path 303 has been confirmed by the transport sensor 316, the leading edge of the original G is aligned to prevent oblique transport, the original G is fed out at a prescribed reading timing, the front and back sides of that original G are reversed, and then the original G is transported to the original reading glass 201a.

Then, light from the light source unit 210 is irradiated via the original reading glass 201a to one face of the original G that has passed over the original reading glass 201a, and reflected by that one face. The light that has been reflected from the one face of the original G, as with the above stationary original method, is reflected by the first mirror 230, then 180° light path conversion of that reflected light is performed by the second and third mirrors 203a and 203b of the mirror unit 203, the light forms an image on the light-receiving face 205d of the photoelectric conversion element 205 via the imaging lens 204, and here an original image is read and converted to an analog signal. Note that the reading operation by the photoelectric conversion element 205 is the same also in the case of duplex reading, described later, so a description of this operation is omitted below.

The original G for which reading is finished is pulled from above the original reading glass 201a by the downstream side transport roller pair 305, and via the switchback transport path 313 of the first transport path 303, is discharged onto the discharge tray 302 by the reverse roller pair 310, which is capable of reversible rotation.

When reading both one face and the other face of an original G, once one face has been read, the original G is not discharged to the discharge tray 302, but rather, is transported such that the trailing edge of the original G is positioned in the switchback transport path 313, and is transported in reverse in the reverse transport direction Y2 by the reverse roller pair 310 that rotate in the reverse direction, and guided to the second transport path 311 by the switching claw 312 that is in the first switching posture. By the original G that has been guided to the second transport path 311 again returning to the first transport path 303 via the second transport path 311, the front and back faces of the original G are reversed and the original G is transported to the upstream side transport roller pair 304, and passed over the original reading glass 201a where the other face is read. By the original G for which such duplex reading has finished then again returning to the first transport path 303, the front and back faces of the original G are reversed and the original G is transported by the transport roller pairs 304 and 305, and then passes through the switchback transport path 313 of the first transport path 303, and is discharged to the discharge tray 302 via the reverse roller pair 310 that rotate in the forward direction.

Figure 3A:
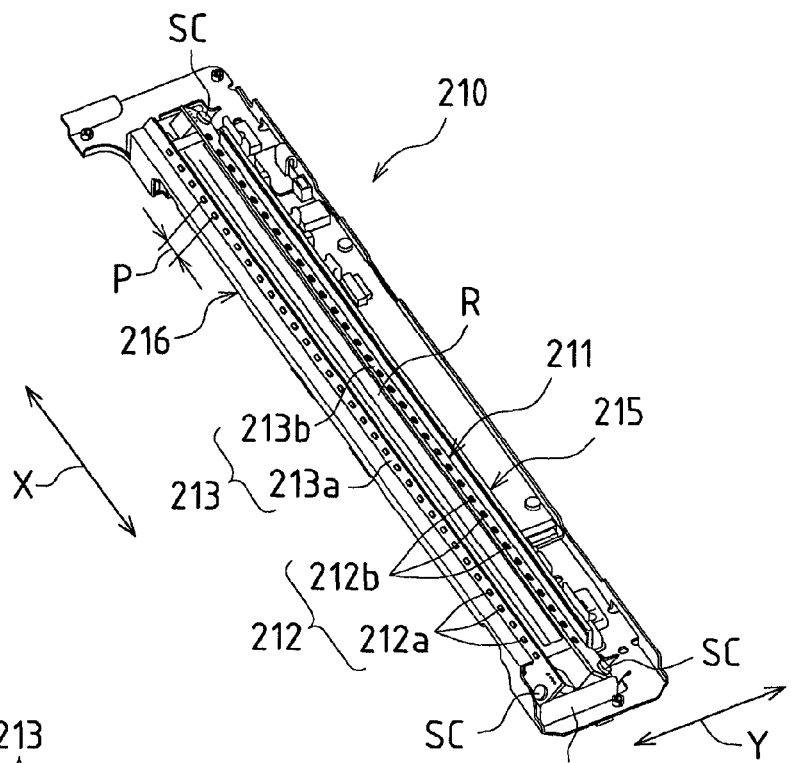
FIGS. 3A and 3B show the schematic configuration of a light source unit, where
Figure 3B:
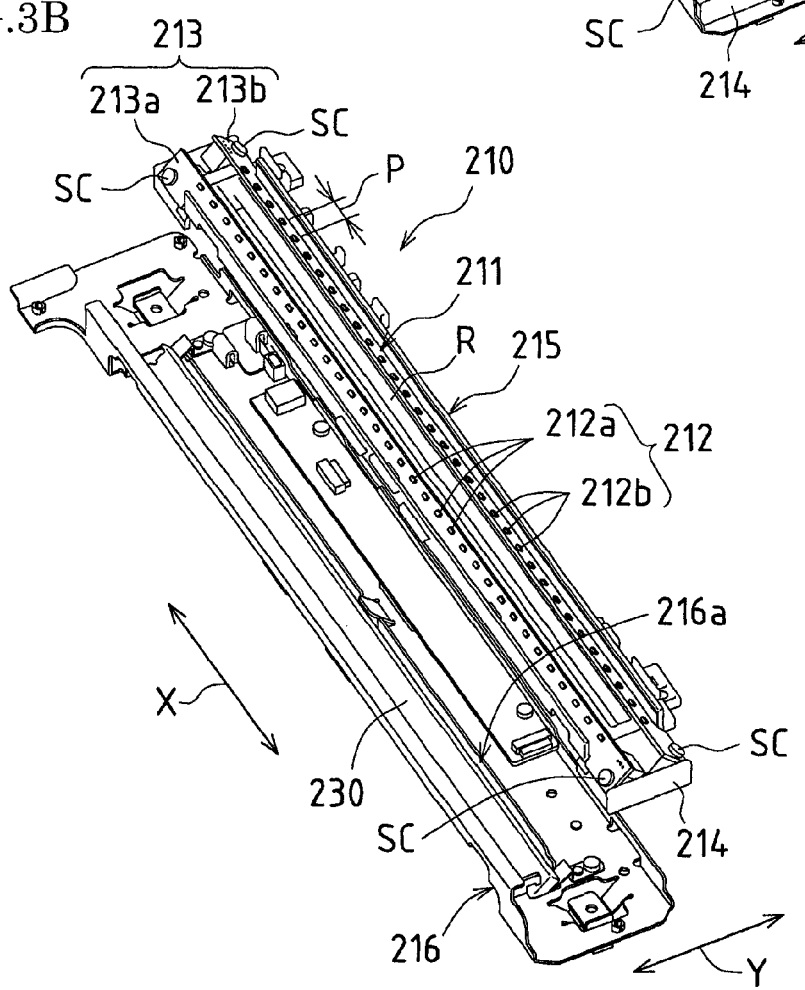
Figure 4A:
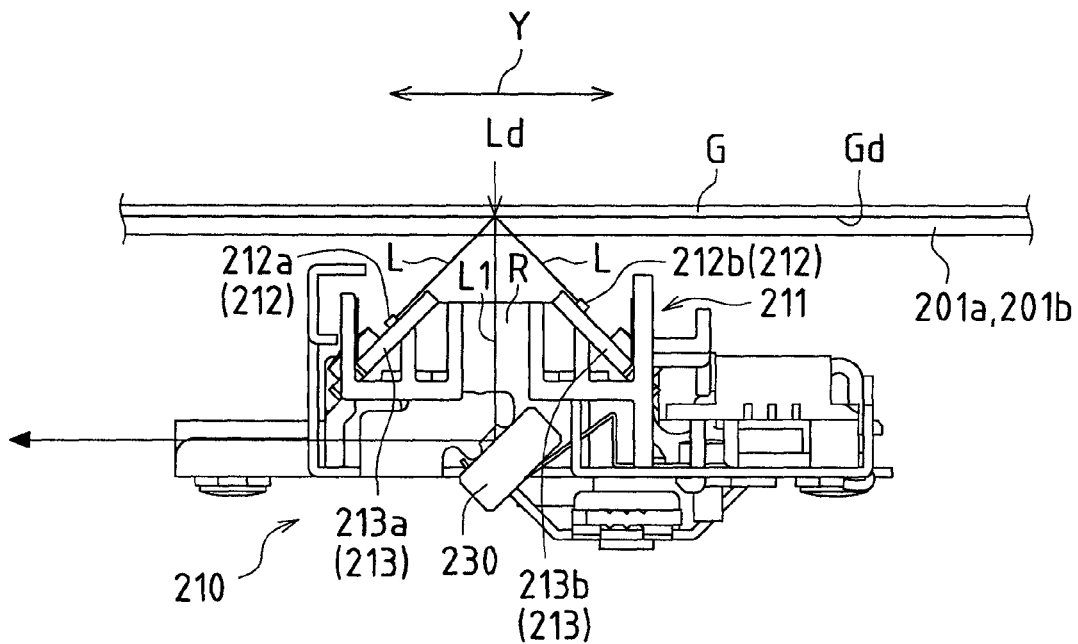
FIGS. 4A and 4B show the schematic configuration of a light source unit, where
Figure 4B:
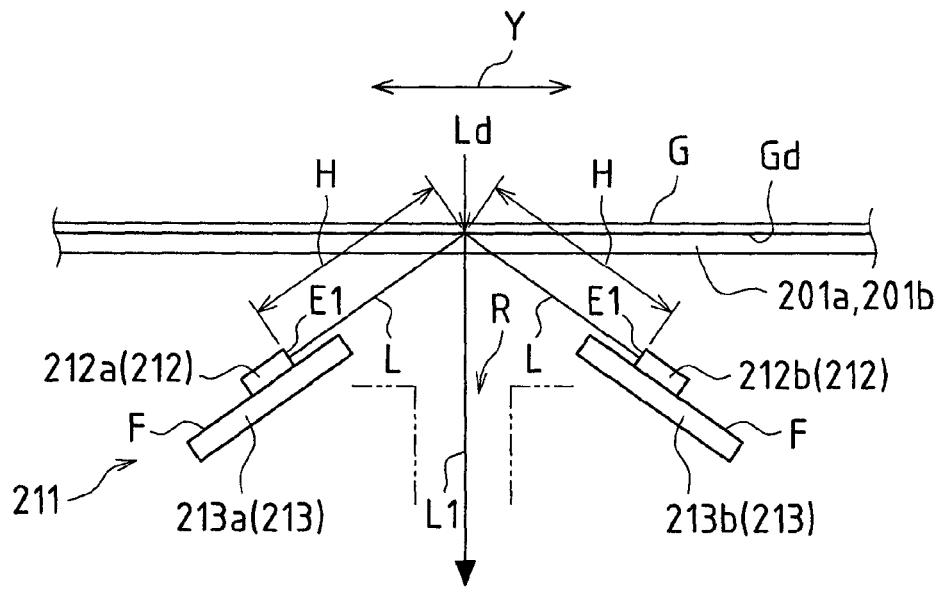

FIGS. 3A and 3B show the schematic configuration of the light source unit 210. FIG. 3A is a perspective view thereof, and FIG. 3B is an exploded perspective view thereof. FIGS. 4A and 4B show the schematic configuration of the light source 211 in the light source unit 210, where FIG. 4A is a side view of the light source unit 210, and FIG. 4B is a side view of the light source 211. Also shown in FIGS. 4A and 4B are the original reading glass 201a, the glass platen 201b, and the original G.

Figure 5:
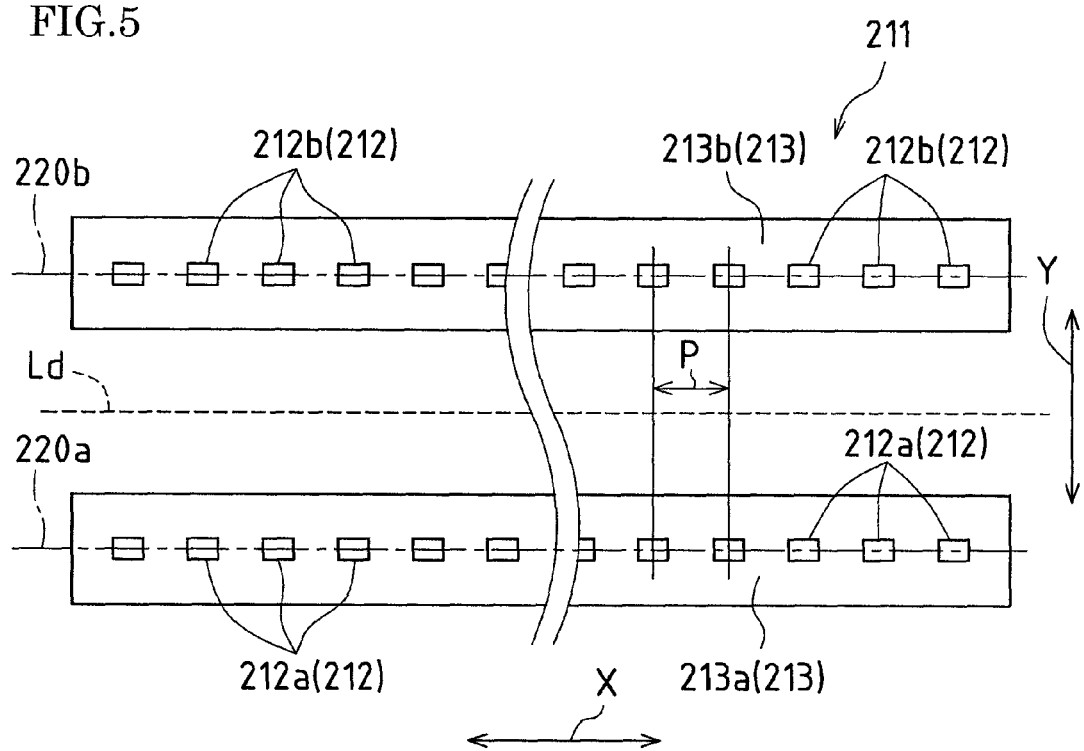
FIG. 5 is a schematic plan view of a substrate in which a plurality of light-emitting elements are disposed in a row.

FIG. 5 is a schematic plan view of a substrate 213 in which a plurality of light-emitting elements 212 are disposed in a row.

In the light source unit 210 according to an embodiment of the present invention, light from the plurality of light-emitting elements 212 disposed in a row on the substrate (referred to below as a light source substrate) 213 is irradiated toward a light irradiation face Gd of the original G.

The light source 211 provided in the light source unit 210 includes the plurality of light-emitting elements 212, and the light source substrate 213 on which the plurality of light-emitting elements 212 are mounted. A light-emitting diode (LED) element is used for each of the plurality of light-emitting elements 212. Each of the light-emitting elements 212 has directional properties that are stronger in one predetermined direction. The direction in which luminous flux is strongest among the light emitted from the respective light-emitting elements 212 is set to a light axis L. Also, the same type of light-emitting element is used for each of the light-emitting elements.

The plurality of light-emitting elements 212 irradiate light toward the side of a constant light irradiation area Ld that extends in the main scanning direction X in the original G. This light irradiation area Ld serves as the original reading position.

In the present embodiment, the plurality of light-emitting elements 212 are disposed in a row on both sides in the sub-scanning direction Y along the light irradiation face Gd orthogonal to the main scanning direction X, relative to the light irradiation area Ld. The plurality of light-emitting elements 212 are disposed such that their respective light axes L are at a right angle to the main scanning direction X.

Specifically, in the plurality of light-emitting elements 212, among both sides in the sub-scanning direction Y, on one side a plurality of first light-emitting elements 212a are disposed in a row in the main scanning direction X, and on the other side a plurality of second light-emitting elements 212b are disposed in a row in the main scanning direction X. That is, the plurality of light-emitting elements 212 are disposed in two rows, namely a first light-emitting element row 220a configured with the first light-emitting elements 212a and a second light-emitting element row 220b configured with the plurality of second light-emitting elements 212b.

The light source substrate 213 is configured with first and second light source substrates 213a and 213b that extend in the main scanning direction X and are parallel to each other. The plurality of first light-emitting elements 212a are mounted to the first light source substrate 213a, and the plurality of second light-emitting elements 212b are mounted to the second light source substrate 213b.

Also, in the present embodiment, a pitch P (distance between element centers in the main scanning direction X) of each light-emitting element in the plurality of first light-emitting elements 212a and the plurality of second light-emitting elements 212b is set to the same distance for each light-emitting element. Furthermore, in the first light-emitting element row 220a and the second light-emitting element row 220b, the first light-emitting elements 212a and the second light-emitting elements 212b are disposed in a row such that pitch positions are aligned in the sub-scanning direction Y (in a configuration with uniform pitch positions). Here, there are the same number of first light-emitting elements 212a and second light-emitting elements 212b.

More specifically, the light source unit 210 is provided with a light-emitting element array unit 215, and a mirror base unit 216 in which the light-emitting element array unit 215 is provided.

The light-emitting element array unit 215 is provided with the first light-emitting elements 212a, the first light source substrate 213a, the second light-emitting elements 212b, the second light source substrate 213b, and a base 214 provided with the first light source substrate 213a and the second light source substrate 213b.

Specifically, the first light source substrate 213a and the second light source substrate 213b are disposed on the base 214 such that their longitudinal direction points in the main scanning direction. In the base 214, the first and second light source substrates 213a and 213b are fixed by a fixing member SC such as a screw at both ends in the main scanning direction X, with a predetermined space between the light source substrates in the sub-scanning direction Y. Thus, the first light-emitting elements 212a and the second light-emitting elements 212b are respectively disposed in a row in the main scanning direction X on both sides in the sub-scanning direction Y, relative to the light irradiation area Ld.

In the base 214, furthermore, an opening (here, a slit) R that extends in the main scanning direction X for allowing reflected light L1 from the original G to pass through is formed between the first light source substrate 213a and the second light source substrate 213b. The slit R is disposed below the light irradiation area Ld, which is the original reading position when reading an original. The first light-emitting element row 220a and the second light-emitting element row 220b are disposed in a row on both sides of the slit R in the cross-wise direction.

The first mirror 230 is provided in the mirror base unit 216. Specifically, the first mirror 230 is supported in a state passed through an opening 216a in the main scanning direction X of the mirror base unit 216 so as to guide light reflected by the light irradiation face Gd of the original G to the second mirror 203a of the mirror unit 203 via the slit R provided in the base 214.

Also, in the present embodiment, as shown in FIG. 4B, the plurality of first light-emitting elements 212a and the plurality of second light-emitting elements 212b each have a light-emitting face E1 that performs side light emission in which light is emitted such that the light axis L is parallel to a light-emitting element disposed face F of the first light source substrate 213a and the second light source substrate 213b on which the plurality of first light-emitting elements 212a and the plurality of second light-emitting elements 212b are respectively disposed. Specifically, the first light source substrate 213a on which the first light-emitting elements 212a are mounted and the second light source substrate 213b on which the second light-emitting elements 212b are mounted, are disposed in a shape such that the opposite side from the original G is wider when viewed from the side, so that the direction of the light axis L points toward the side of the light irradiation area Ld. The light irradiation area Ld is positioned in the middle between the first light source substrate 213a and the second light source substrate 213b.

In the configuration of the above-described light source unit 210, the plurality of light-emitting elements 212 are disposed in a row on both sides in the sub-scanning direction Y, relative to the light irradiation area Ld, but a configuration may also be adopted in which the plurality of light-emitting elements 212 are disposed in a row on only one side.

Figure 6:
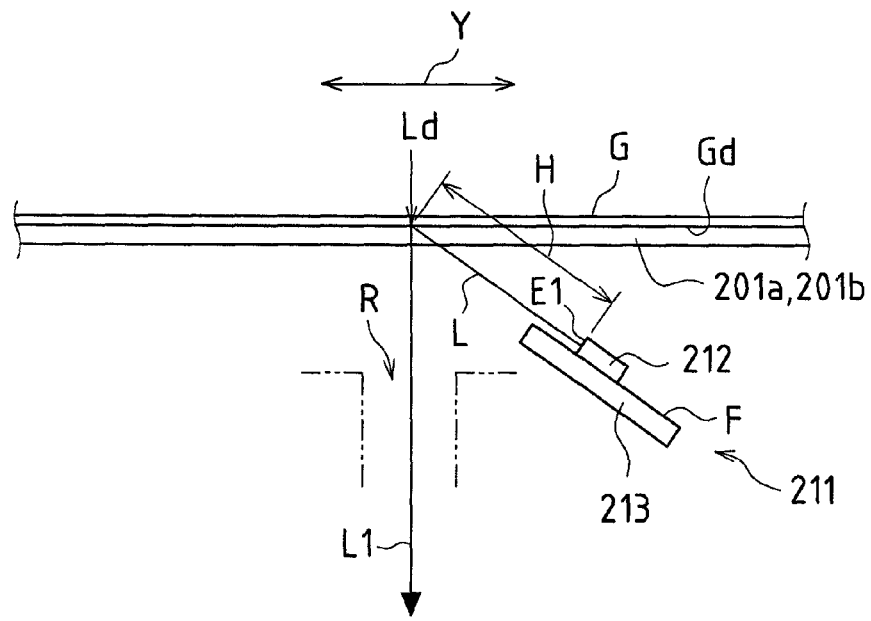
FIG. 6 is a schematic side view that shows an example in which a plurality of light-emitting elements are disposed in a row only on one side in a sub-scanning direction relative to a light irradiation area.

FIG. 6 is a schematic side view that shows an example in which the plurality of light-emitting elements 212 are disposed in a row only on one side in the sub-scanning direction Y relative to a light irradiation area Ld.

The plurality of light-emitting elements 212 shown in FIG. 6 are mounted to the light source substrate 213 disposed on one side in the sub-scanning direction Y with reference to the light irradiation area Ld, and have the light-emitting face E1 that performs side light emission in which light is emitted such that the light axis L is parallel to the disposed face F.

Specifically, the light source substrate 213 is disposed inclined such that the direction of the light axis L points toward the side of the light irradiation area Ld.

Also, regardless of whether the plurality of light-emitting elements 212 are disposed in a row on both sides or are disposed only on one side, top light emission in which light is emitted such that the light axis L is orthogonal to the disposed face F of the light source substrate 213 where the plurality of light-emitting elements 212 are mounted may also be performed.

Figure 7A:
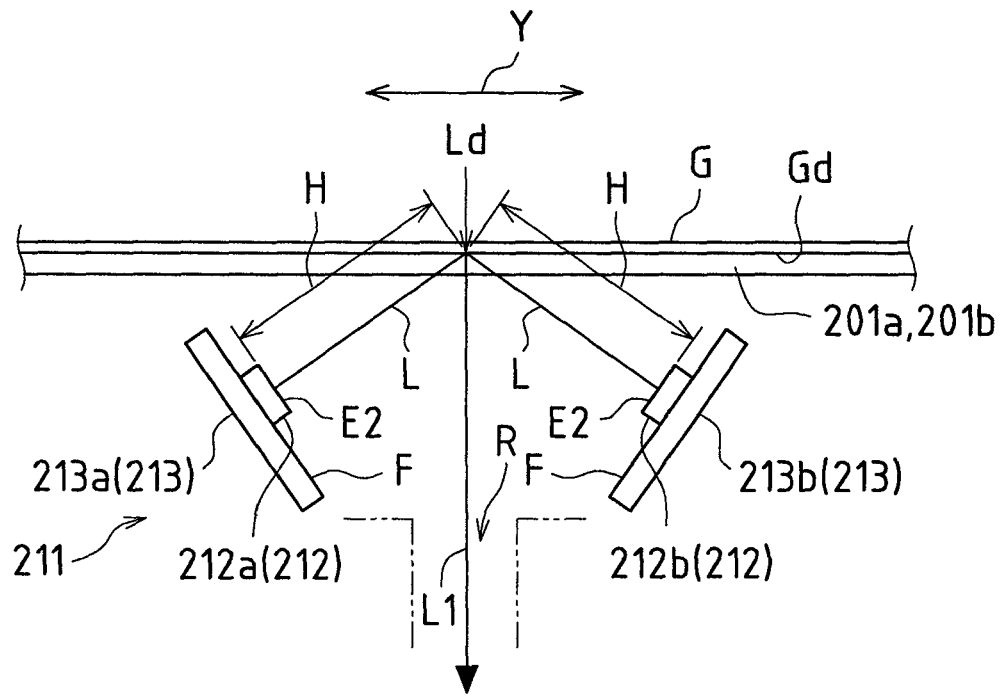
FIGS. 7A and 7B are schematic side views that show an example of a plurality of light-emitting elements having a light-emitting face that performs top light emission, where
Figure 7B:
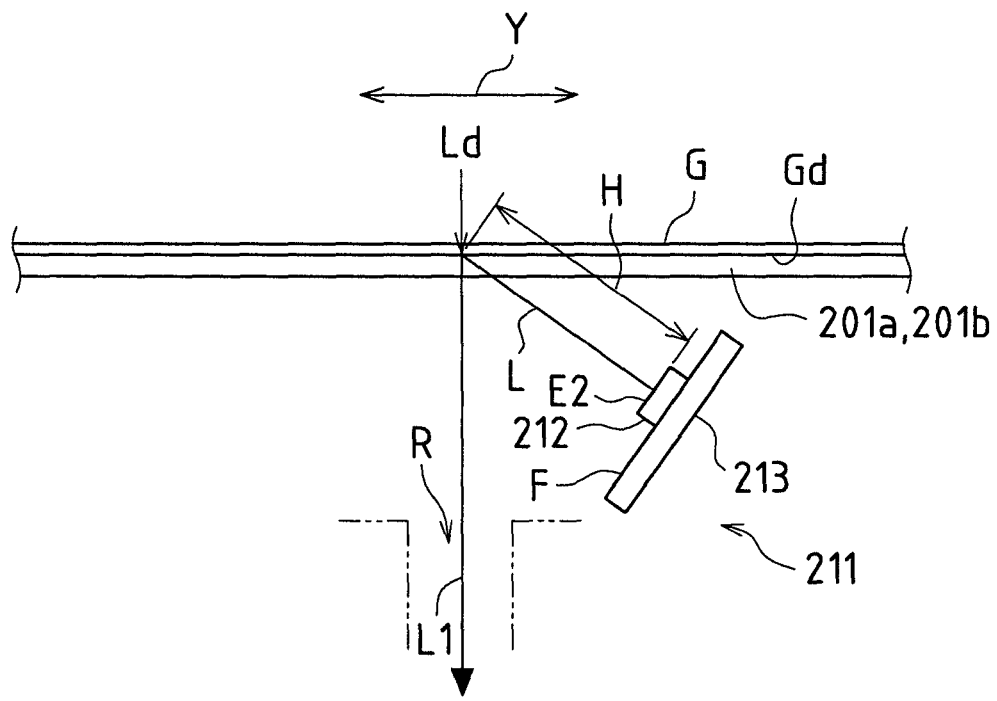

FIGS. 7A and 7B are schematic side views that show an example of the plurality of light-emitting elements 212 having a light-emitting face E2 that performs top light emission. FIG. 7A shows an example in which the first light-emitting elements 212a and the second light-emitting elements 212b disposed in a row on both sides perform top light emission, and FIG. 7B shows an example in which the light-emitting elements 212 disposed in a row on only one side perform top light emission.

As shown in FIG. 7A, when the first light-emitting elements 212a and the second light-emitting elements 212b have the light-emitting face E2 that performs top light emission, it is possible to dispose the first light source substrate 213a and the second light source substrate 213b in a reverse shape wider on the side of the original G, such that the direction of the light axis L points toward the side of the light irradiation area Ld. The light irradiation area Ld is positioned in the middle between the first light source substrate 213a and the second light source substrate 213b.

As shown in FIG. 7B, when the light-emitting elements 212 are disposed in a row only on one side, it is possible to dispose the light source substrate 213 in an inclined manner such that the direction of the light axis L points toward the side of the light irradiation area Ld.

The light-emitting elements can thus be configured disposed as shown in FIGS. 4A to 7B, but when the light-emitting elements are disposed in a row on both sides in a uniform pitch position configuration as shown in FIG. 5, in comparison to a configuration in which the light-emitting elements are disposed in a row on only one side as shown in FIGS. 6 and 7B, it is possible to double the number of light-emitting elements and thus double illuminance.

Also, when the light-emitting elements perform light emission as either side light emission or top light emission, by using a configuration that performs side light emission or a configuration that performs top light emission according to the disposed configuration of constituent elements within the light source unit 210, it is possible to effectively use open space within the light source unit 210.

Figure 8:
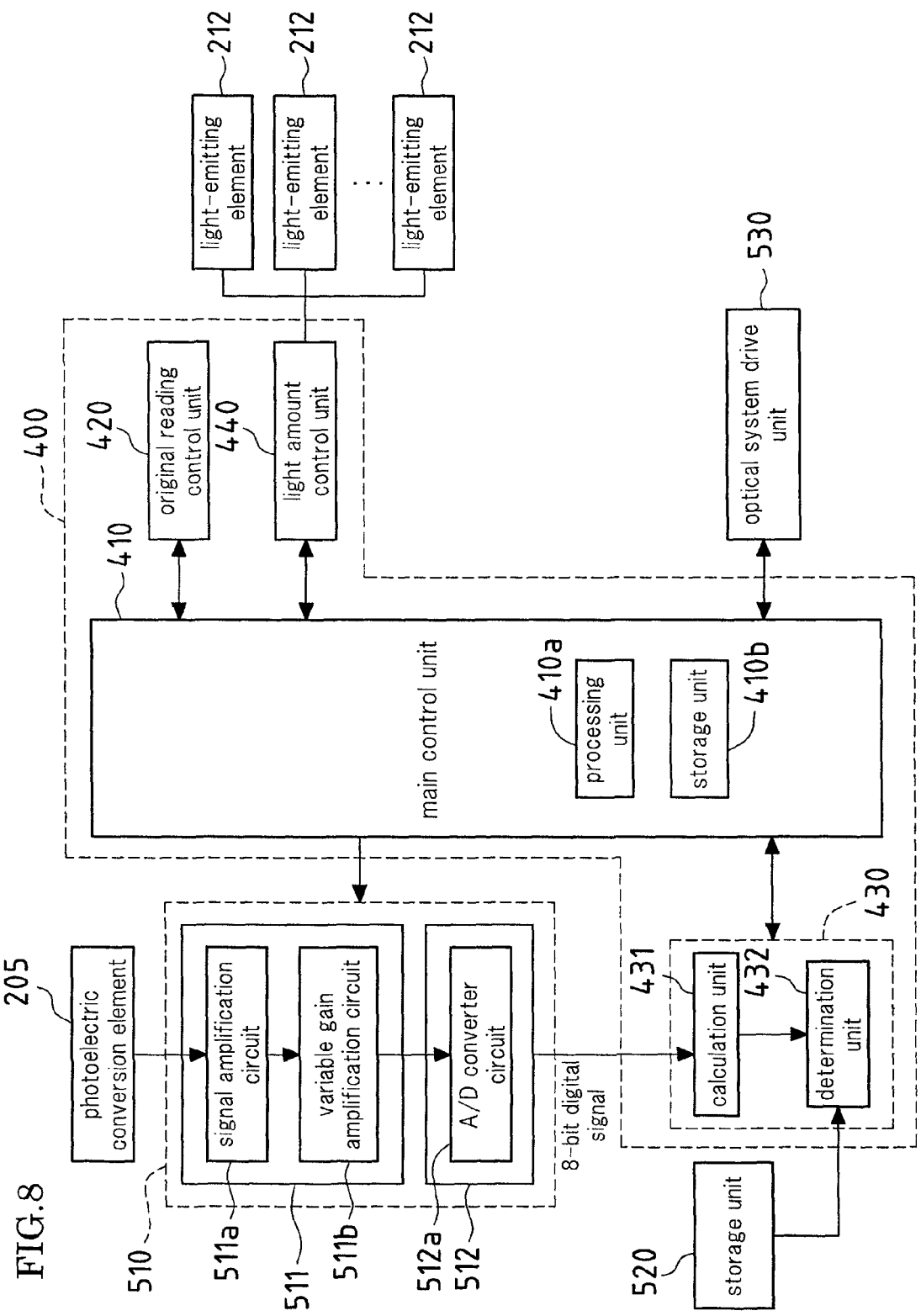
FIG. 8 shows the schematic configuration of a control system of an image reading apparatus according to the present embodiment, and is a control block diagram in which a control unit in the image reading apparatus is shown in the center.
Figure 9:
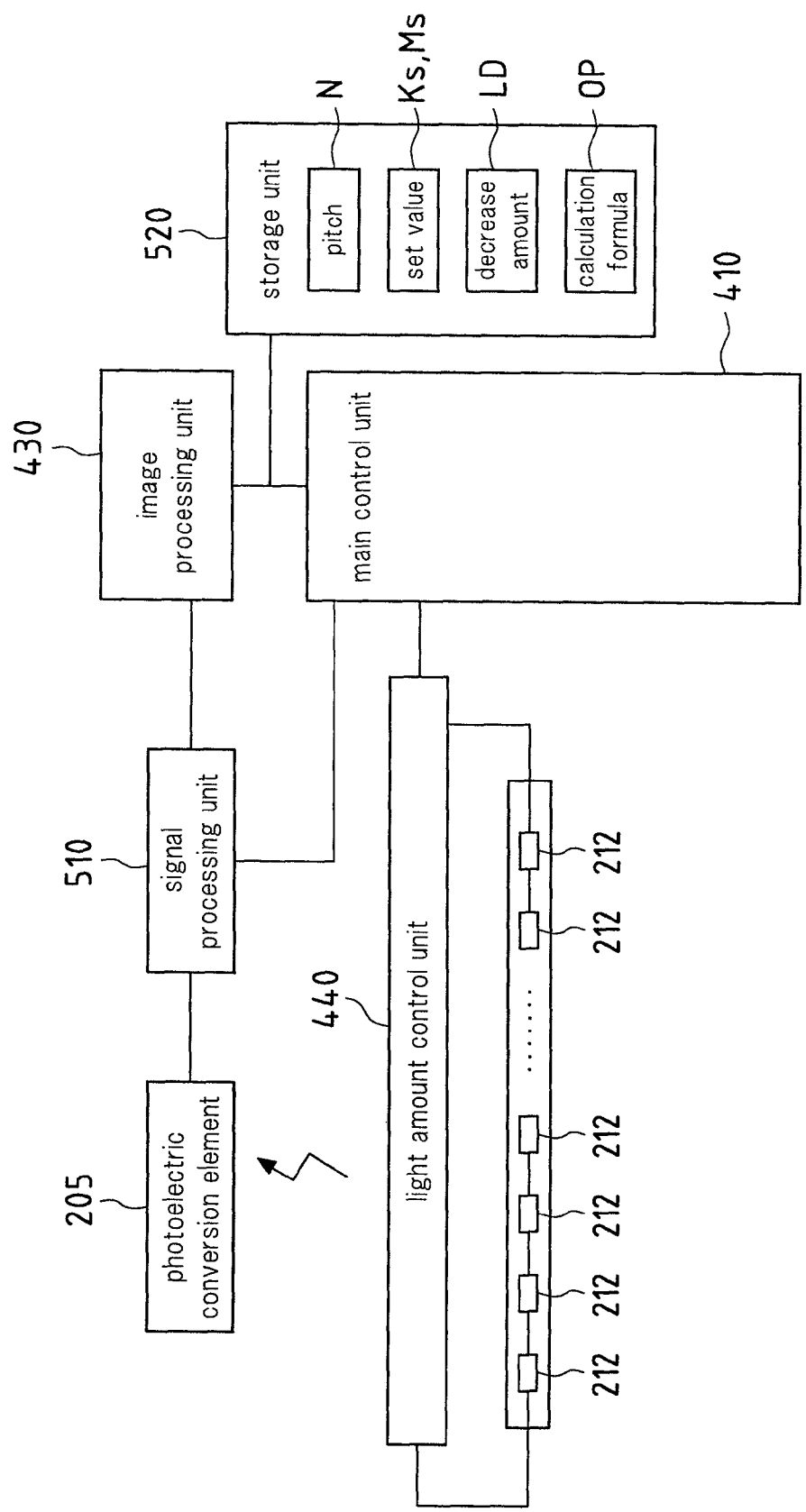
FIG. 9 shows in detail the light amount control unit portion of the block diagram shown in FIG. 8.

FIG. 8 shows the schematic configuration of a control system of an image reading apparatus according to the present embodiment, and is a control block diagram in which a control unit 400 of the image reading apparatus 100 is shown in the center. FIG. 9 shows in detail a light amount control unit 440 portion of the block diagram shown in FIG. 8. In FIG. 9, an original reading control unit 420, the optical system drive unit 530, and so forth are not shown. This is also true with respect to FIG. 13 described later.

As shown in FIG. 8, the image reading apparatus 100 according to the present embodiment is further provided with a control unit 400 in charge of control of the image reading apparatus 100 as a whole, a signal processing unit 510, and a storage unit 520.

The control unit 400 is provided with a main control unit 410, an original reading control unit 420, an image processing unit 430, and a light amount control unit 440.

The main control unit 410 is connected to the original reading control unit 420, the image processing unit 430, the light amount control unit 440, the signal processing unit 510, and the optical system drive unit 530.

Specifically, the main control unit 410 is configured with a microcomputer that includes a processing unit 410a such as a CPU and a storage unit 410b that includes memories such as a ROM and a RAM. The image reading apparatus 100 performs control of various constituent elements by the processing unit 410a of the main control unit 410 loading into the RAM of the storage unit 410b and executing control programs that have been stored in advance in the ROM of the storage unit 410b. The main control unit 410 is instructed by a control unit (not shown) that controls an overall image forming operation, provided in the image forming apparatus D.

The original reading control unit 420 controls an operation to read an original G by the photoelectric conversion element 205 based on instruction signals from the main control unit 410.

The signal processing unit 510 is connected to the photoelectric conversion element 205, and processes a signal from the photoelectric conversion element 205 based on an instruction signal from the main control unit 410. The signal processing unit 510, here, is configured as an analog front end (AFE) IC, and performs signal processing of an output signal from the photoelectric conversion element 205 such as OB (Optical Blank) clamping, CDS (Correlated Double Sampling), AGC (Auto Gain Control), and ADC (Analog-to-Digital Conversion).

In the present embodiment, as shown in FIG. 8, the signal processing unit 510 is provided with an amplification unit 511 that amplifies an analog signal from the photoelectric conversion element 205, and an A/D conversion unit 512 that converts an analog signal from the amplification unit 511 to a digital signal. The amplification unit 511 includes a signal amplification circuit 511a and a variable gain amplification circuit 511b. The A/D conversion unit 512 includes an A/D converter circuit 512a.

The signal amplification circuit 511a is configured as a circuit that performs gain processing on an analog output signal from the photoelectric conversion element 205. The variable gain amplification circuit 511b is configured to be capable of adjusting the gain of an analog signal from the signal amplification circuit 511a.

The A/D converter circuit 512a is configured as a circuit that converts an analog signal from the variable gain amplification circuit 511b to a digital signal (here, an 8-bit digital image signal).

The image processing unit 430 performs various image processing on a digital signal that has been converted by the A/D converter circuit 512a based on an instruction signal from the main control unit 410, and here, is configured as an image processing ASIC (Application Specific Integrated Circuit).

Also, the light amount control unit 440 is connected to the light-emitting elements 212, and controls on/off and the light output amount of the light-emitting elements 212 based on an instruction signal from the main control unit 410.

Specifically, as shown in FIG. 9, the light-emitting elements 212 are connected in series, and terminals on both sides of the light-emitting elements connected in series are connected to the light amount control unit 440. The light amount control unit 440 performs centralized adjustment of the overall output light amount of the light-emitting elements 212 according to an instruction signal from the main control unit 410. The light amount control unit 440, here, is configured as a light-emitting element control driver.

Incidentally, because light-emitting elements such as LEDs have directional properties that are stronger in one direction, bright spots occur on the light irradiation face Gd of an original G, so uneven illuminance due to the bright spots on the light irradiation face Gd of the original G may sometimes occur.

Consequently, in the present embodiment, the control unit 400 determines the state of the bright spots (specifically, a bright spot level) on the light irradiation face Gd of the original G from a read value of the photoelectric conversion element 205, and adjusts the output light amount from the light-emitting elements 212 based on the determination result of the bright spot level.

Specifically, when a determination has been made from the determination result of bright spot level on the light irradiation face Gd of the original G that the bright spots occur, the control unit 400 performs control to decrease the output light amount from the light-emitting elements 212 using the light amount control unit 440 according to the bright spot level.

Specifically, the original reading control unit 420 irradiates light from the light-emitting elements 212 to a reference image for detecting bright spot level on the light irradiation face Gd of the original G, and reads reflected light reflected from the reference image with the photoelectric conversion element 205.

For the reference image, the white reference member 318 for shading correction may be read, or a gray chart that can be placed on the glass platen 201b and can be transported by the automatic original feeding apparatus 300 may be read.

In the present embodiment, the original reading control unit 420 is configured to be capable of, when reading the reference image, selectively switching between a first reading operation that reads the white reference member 318, and a second reading operation that reads a gray chart.

In consideration of the fact that the level of unevenness of an image that has been read with a gray chart is greater than the level of unevenness of an image that has been read with the white reference member 318, it is preferable to read a gray chart for the reference image. Here, the gray chart is an original in which an image of constant halftone density has been uniformly formed.

Figure 10:
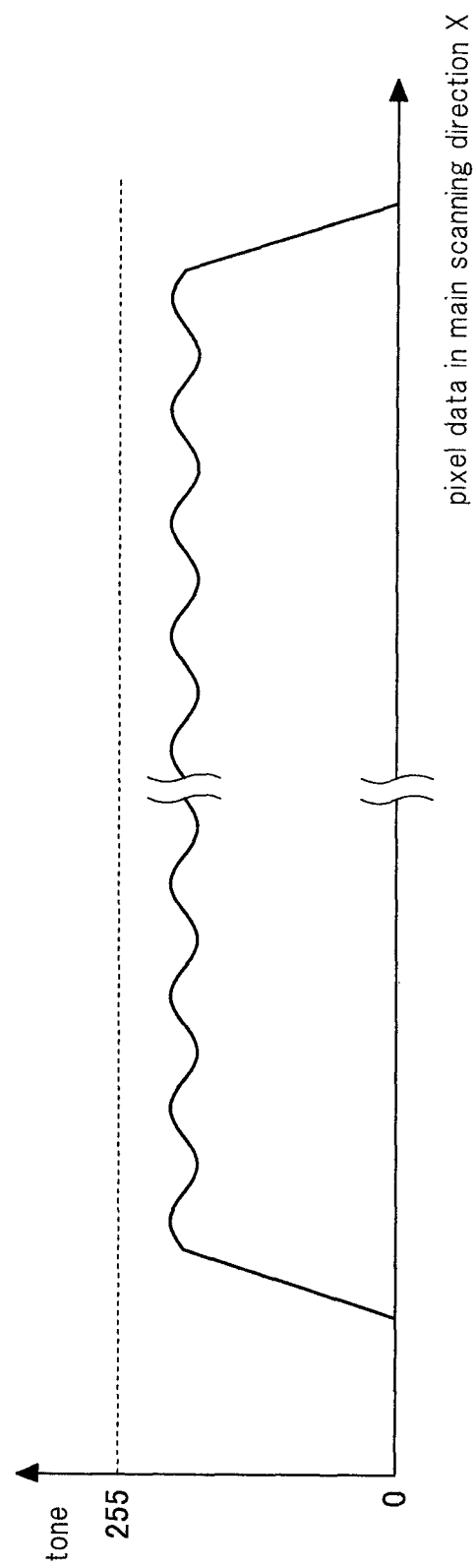
FIG. 10 is a graph of read values obtained by a photoelectric conversion element reading illuminance resulting from bright spots on the light irradiation face of the original due to the plurality of light-emitting elements.

FIG. 10 is a graph of read values obtained by reading illuminance resulting from bright spots on the light irradiation face Gd of an original G due to the plurality of light-emitting elements 212 with the photoelectric conversion element 205.

The read values shown in FIG. 10 are digital signal values obtained by the A/D converter circuit 512a converting output values obtained by reading the white reference member 318 with the photoelectric conversion element 205. Here, 0 is a black tone and 255 is a white tone, and values 1 to 254 are halftones. In this case, by way of example, as an average value of digital signals obtained by reading the white reference member 318 and a gray chart, a value of about "250" is obtained with the white reference member 318, and a value of about "120" is obtained with the gray chart. This is also true with respect to FIG. 14 described later.

Figure 11:
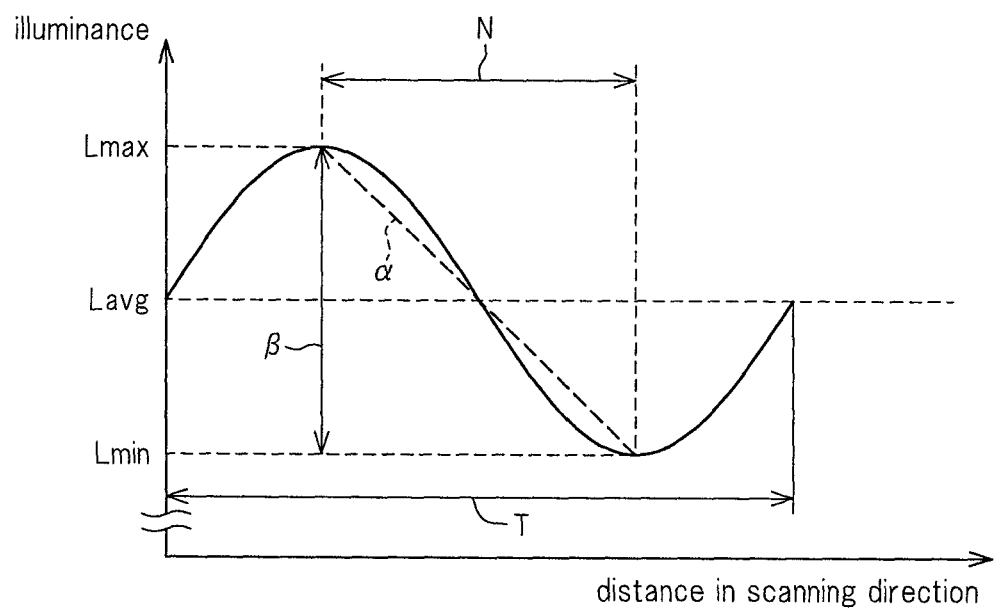
FIG. 11 is a diagram for describing a slope of unevenness and unevenness [%] on the light irradiation face of the original due to the plurality of light-emitting elements, and shows light-dark repetition in an illuminance cycle in a main scanning direction.

FIG. 11 is a diagram for describing a slope K of unevenness and unevenness [%] M on the light irradiation face Gd of the original G due to the plurality of light-emitting elements 212, and shows light-dark repetition in an illuminance cycle T in the main scanning direction X.

The image processing unit 430 includes a calculation unit 431 that calculates a bright spot level on the light irradiation face Gd of the original G, and a determination unit 432 that determines the presence of bright spots for a calculated value that has been calculated by the calculation unit 431.

The calculation unit 431 calculates calculated values K and M for determining bright spot level on the light irradiation face Gd of the original G from the read values read by the photoelectric conversion element 205.

The determination unit 432 compares the calculated values K and M that have been calculated by the calculation unit 431 to set values Ks and Ms that have been stored in advance to determine the presence of bright spots on the light irradiation face Gd of the original G. Here, the set values Ks and Km are values serving as a determination reference for the presence of bright spots on the light irradiation face Gd of the original G.

More specifically, the calculation unit 431 calculates the calculated values K and M based on a maximum value and a minimum value of illuminance in the illuminance cycle T, which indicates repetition of light-dark in the main scanning direction X on the light irradiation face Gd of the original G due to the light-emitting elements 212.

More specifically, the calculation unit 431 calculates the calculated value K for each light-emitting element (each illuminance cycle) from the change rate (slope) of illuminance difference versus distance in the main scanning direction X in the illuminance cycle T, or alternatively, calculates the calculated value M for each light-emitting element (each illuminance cycle) from the change rate (unevenness [%]) of illuminance difference versus an average value of illuminance in the illuminance cycle T. The determination unit 432 compares the calculated values K and M calculated for each light-emitting element (each illuminance cycle) by the calculation unit 431 to the set values Ks and Km to determine the presence of bright spots for each light-emitting element (each illuminance cycle).

Here, the calculated values K and M can be set to values calculated by below Formula (1) or Formula (2), where the maximum value of illuminance is Lmax, the minimum value of illuminance is Lmin, the distance (pitch) between the maximum value of illuminance Lmax and the minimum value Lmin in the main scanning direction X is N, and the average value of the maximum value of illuminance Lmax and the minimum value Lmin is Lavg.

$$K = (L\max - L\min)/N \qquad \text{Formula (1)}$$

$$M = (L\max - L\min)/L\text{avg} \qquad \text{Formula (2)}$$

In the present embodiment, the calculation unit 431 is configured to be capable of selectively switching between a first calculation of calculating the calculated value K by Formula (1), and a second calculation of calculating the calculated value M by Formula (2)

The calculated value K calculated by Formula (1) is set as the slope of a straight line (broken line) a drawn between the maximum value Lmax and the minimum value Lmin, and the calculated value M calculated by Formula (2) is set as unevenness [%], which indicates the extent of an amplitude β of the illuminance waveform.

In the storage unit 520, the pitch N, the set value Ks serving as a determination reference for the calculated value (slope) K, and the set value Ms serving as a determination reference for the calculated value (unevenness [%]) M, are set (stored) in advance. The set values Ks and Ms can also be set by testing or the like in advance. Also stored in advance in the storage unit 520 is a decrease amount LD of the output light amount of the light-emitting elements 212 for eliminating bright spots when as a result of determining bright spot level on the light irradiation face Gd of the original G, it was determined that there were bright spots. A configuration can be adopted in which the setting for the decrease amount LD can be changed.

Figure 12:
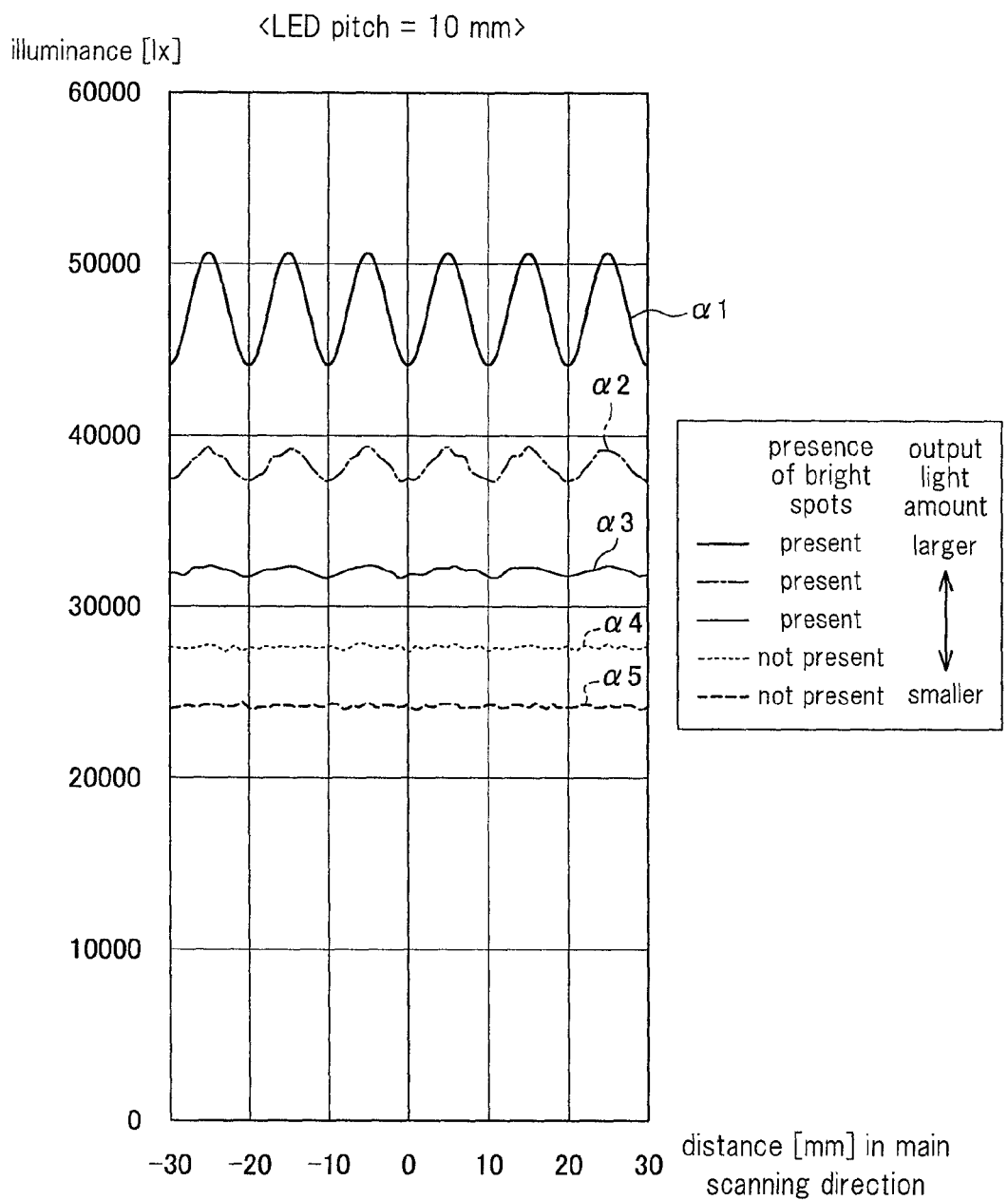
FIG. 12 is a graph that shows an example of changing the output light amount of light-emitting elements in five levels, with respect to illuminance on the light irradiation face of the original versus distance in the main scanning direction.

More specifically, FIG. 12 is a graph that shows an example of changing the output light amount of light-emitting elements 212 in five levels, with respect to illuminance [lx (lux)] on the light irradiation face Gd of the original G versus distance [mm] in the main scanning direction X. In FIG. 12, using a gray chart as the original G, a light axis distance H (see FIGS. 4B, 6, 7A, and 7B), which is the distance of the light axis L from the light-emitting elements 212 to the light irradiation area Ld of the original G, is fixed, and the light-emitting element pitch (here, the LED pitch) P (see FIG. 5) is set to 10 [mm].

As shown in FIG. 12, as the output light amount from the light-emitting elements 212 decreases, bright spots are less likely to occur on the light irradiation face Gd of the original G, and thus there is a tendency for uneven illuminance due to the bright spots on the light irradiation face Gd of the original G to be mitigated.

Here, the set value Ks serving as a determination reference for the calculated value (slope) K is set to 120. The set value Ms serving as a determination reference for the calculated value (unevenness [%]) M is set to 2.2 [%].

When the calculated value (slope) K that has been calculated by the calculation unit 431 is larger than the set value (slope) Ks (here, 120) that has been stored in the storage unit 520, the determination unit 432 determines that there are bright spots on the light irradiation face Gd of the original G, and when the calculated value (slope) K is no more than the set value Ks (here, 120), the determination unit 432 determines that there are not bright spots.

When the calculated value (unevenness [%]) M that has been calculated by the calculation unit 431 is larger than the set value (unevenness [%]) Ms (here, 2.2 [%]) that has been stored in the storage unit 520, the determination unit 432 determines that there are bright spots on the light irradiation face Gd of the original G, and when the calculated value (unevenness [%]) M is no more than the set value Ms (here, 2.2 [%]), the determination unit 432 determines that there are not bright spots.

In the example shown in FIG. 12, in a graph of illuminance corresponding to five levels of output light amount of the light-emitting elements 212, reference symbols α1 to α5 indicate decreasing output light amount from a first level to a fifth level.

[Illuminance Graph α1]

In a graph α1 of illuminance corresponding to the first level of the output light amount of the light-emitting elements 212, in one illuminance cycle T, the maximum value Lmax of illuminance is 50500 [lx], the minimum value Lmin of illuminance is 44000 [lx], the pitch N of the maximum value Lmax of illuminance and the minimum value Lmin is 5 [mm], and the average value Lavg of the maximum value Lmax of illuminance and the minimum value Lmin is 47250 [lx].

Thus, the calculated value (slope) K is 1300 (=(50500 [lx]−44000 [lx])/5 [mm]), and this is larger than the set value (slope) Ks (here, 120) stored in the storage unit 520, so a determination of "present" is made regarding bright spots.

Also, the calculated value (unevenness [%]) M is 13.8 [%] (=(50500 [lx]−44000 [lx])/47250 [lx]), and this is larger than the set value (unevenness [%]) Ms (here, 2.2 [%]) stored in the storage unit 520, so a determination of "present" is made regarding bright spots.

[Illuminance Graph α2]

In a graph α2 of illuminance corresponding to the second level of the output light amount of the light-emitting elements 212, in one illuminance cycle T, the maximum value Lmax of illuminance is 39500 [lx], the minimum value Lmin of illuminance is 37300 [lx], the pitch N of the maximum value Lmax of illuminance and the minimum value Lmin is 5 [mm], and the average value Lavg of the maximum value Lmax of illuminance and the minimum value Lmin is 38400 [lx].

Thus, the calculated value (slope) K is 440 (=(39500 [lx]−37300 [lx])/5 [mm]), and this is larger than the set value Ks (here, 120), so a determination of "present" is made regarding bright spots.

Also, the calculated value (unevenness [%]) M is 5.7 [%] (=(39500 [lx]−37300 [lx])/38400 [lx]), and this is larger than the set value Ms (here, 2.2 [%]), so a determination of "present" is made regarding bright spots.

[Illuminance Graph α3]

In a graph α3 of illuminance corresponding to the third level of the output light amount of the light-emitting elements 212, in one illuminance cycle T, the maximum value Lmax of illuminance is 32500 [lx], the minimum value Lmin of illuminance is 31700 [lx], the pitch N of the maximum value Lmax of illuminance and the minimum value Lmin is 5 [mm], and the average value Lavg of the maximum value Lmax of illuminance and the minimum value Lmin is 32100 [lx].

Thus, the calculated value (slope) K is 160 (=(32500 [lx]−31700 [lx])/5 [mm]), and this is larger than the set value Ks (here, 120), so a determination of "present" is made regarding bright spots.

Also, the calculated value (unevenness [%]) M is 2.5 [%] (=(32500 [lx]−31700 [lx])/32100 [lx]), and this is larger than the set value Ms (here, 2.2 [%]), so a determination of "present" is made regarding bright spots.

[Illuminance Graph α4]

In a graph α4 of illuminance corresponding to the fourth level of the output light amount of the light-emitting elements 212, in one illuminance cycle T, the maximum value Lmax of illuminance is 27900 [lx], the minimum value Lmin of illuminance is 27300 [lx], the pitch N of the maximum value Lmax of illuminance and the minimum value Lmin is 5 [mm], and the average value Lavg of the maximum value Lmax of illuminance and the minimum value Lmin is 27600 [lx].

Thus, the calculated value (slope) K is 120 (=(27900 [lx]−27300 [lx])/5 [mm]), and this is no more than the set value Ks (here, 120), so a determination of "not present" is made regarding bright spots.

Also, the calculated value (unevenness [%]) M is 2.2 [%] (=(27900 [lx]−27300 [lx])/27600 [lx]), and this is no more than the set value Ms (here, 2.2 [%]), so a determination of "not present" is made regarding bright spots.

[Illuminance Graph α5]

In a graph α5 of illuminance corresponding to the fifth level of the output light amount of the light-emitting elements 212, in one illuminance cycle T, the maximum value Lmax of illuminance is 24300 [lx], the minimum value Lmin of illuminance is 23800 [lx], the pitch N of the maximum value Lmax of illuminance and the minimum value Lmin is 5 [mm], and the average value Lavg of the maximum value Lmax of illuminance and the minimum value Lmin is 24050 [lx].

Thus, the calculated value (slope) K is 100 (=(24300 [lx]−23800 [lx])/5 [mm]), and this is no more than the set value Ks (here, 120), so a determination of "not present" is made regarding bright spots.

Also, the calculated value (unevenness [%]) M is 2.1 [%] (=(24300 [lx]−23800 [lx])/24050 [lx]), and this is no more than the set value Ms (here, 2.2 [%]), so a determination of "not present" is made regarding bright spots.

[Control of Output Light Amount of Light-Emitting Elements]

When, as indicated by the illuminance graphs α1 to α3, the determination unit 432 makes a determination of "present" regarding bright spots, the control unit 400 uses the decrease amount LD stored in the storage unit 520 to decrease the output light amount of the light-emitting elements 212 with the light amount control unit 440 until a determination of "not present" is made regarding bright spots. On the other hand, when, as indicated by the illuminance graphs α4 and α5, the determination unit 432 makes a determination of "not present" regarding bright spots, the control unit 400 maintains the output light amount of the light-emitting elements 212 as-is. Also, when the determination unit 432 makes a determination of "not present" regarding bright spots, the control unit 400 may increase the output light amount of the light-emitting elements 212 with the light amount control unit 440 until just before a determination of "present" is made. By adopting such a configuration, it is possible to eliminate bright spots in a state of maximum output light amount of the light-emitting elements 212. The increase amount in this case can be stored in the storage unit 520 like the decrease amount LD, and thus it is possible to adopt a configuration in which settings can be changed.

According to the image reading apparatus 100 described above, the output light amount from the light-emitting elements 212 is adjusted based on the determination result of the state of the bright spots on the light irradiation face Gd of the original G, so specifically when a determination has been made that the bright spots occur from the determination result of bright spot level on the light irradiation face Gd of the original G, the output light amount from the light-emitting elements 212 is decreased, so it is possible to make bright spots less likely to occur on the light irradiation face Gd of the original G. Accordingly, it is possible to reduce bright spots and thus make illuminance uniform on the light irradiation face Gd of the original G, without specifying a luminance rank for the light-emitting elements in a range where there will be no bright spot effects or increasing the number of mounted light-emitting elements as in the conventional technology, that is, without resulting in increased cost.

Also, in the present embodiment, a reference image for detecting bright spot level on the light irradiation face Gd of the original G is read by the photoelectric conversion element 205, the calculated values K and M for determining bright spot level are calculated from the read value read by the photoelectric conversion element 205, and the obtained calculated values K and M are compared to the set values Ks and Ms that have been set in advance to determine the presence of bright spots on the light irradiation face Gd of the original G, so the determination can easily be performed.

Also, in the present embodiment, by reading the white reference member 318 or a gray chart for the reference image, it is possible to precisely detect bright spot level on the light irradiation face Gd of the original G.

Also, in the present embodiment, by calculating the calculated values K and M based on the maximum value Lmax and the minimum value Lmin of illuminance in the illuminance cycle T, and specifically by calculating the calculated value (slope) K by the first calculation, or alternatively, calculating the calculated value (unevenness [%]) M by the second calculation, the calculated values K and M can easily be calculated.

Incidentally, in the present embodiment, when a determination has been made that the bright spots occur, the control unit 400 decreases the output light amount from the light-emitting elements 212, but with this configuration alone, the strength of the signal from the photoelectric conversion element 205 may sometimes be inadequate.

In consideration of this point, the control unit 400 has an adjustment mode for adjusting the amplification degree of the signal from the photoelectric conversion element 205. When decreasing the output light amount from the light-emitting elements 212, the adjustment mode increases the amplification degree of the signal from the photoelectric conversion element 205 to the extent that the output light amount is decreased.

Specifically, a calculation formula OP that calculates amplification degrees Kg and Mg such that the read value obtained by reading a reference image (here, the white reference member 318) becomes a reference reading value to be used as a reference is stored in advance in the storage unit 520. A setting table may be used instead of the calculation formula OP.

The variable gain amplification circuit 511b adjusts the gain of an analog signal from the photoelectric conversion element 205 using the amplification degrees Kg and Mg that have been calculated with the calculation formula OP stored in the storage unit 520, based on an instruction signal from the main control unit 410.

In the image reading apparatus 100 having this configuration, not only is it possible to suppress uneven illuminance due to the bright spots on the light irradiation face Gd of the original G, but as necessary, by adjusting (increasing) the strength of the signal from the photoelectric conversion element 205 according to the amplification degrees Kg and Mg to the extent that the output light amount from the light-emitting elements 212 is decreased, it is possible to easily compensate for inadequate strength of the signal from the photoelectric conversion element 205 due to a decrease in the output light amount from the light-emitting elements 212.

When increasing the output light amount from the light-emitting elements 212, the adjustment mode decreases the amplification degree of the signal from the photoelectric conversion element 205 to the extent that the output light amount is increased. Thus, it is possible to obtain an appropriate signal strength from the photoelectric conversion element 205. Also, in the present embodiment, in the adjustment mode, the signal processing unit 510 is used to adjust the gain of an analog signal from the photoelectric conversion element 205, but a configuration may also be adopted in which the image processing unit 430 is used to adjust the amplification degree of a digital signal.

The light amount control unit 440 may be configured to be capable of separately adjusting the output light amount from the plurality of light-emitting elements 212 for each of the light-emitting elements.

Figure 13:
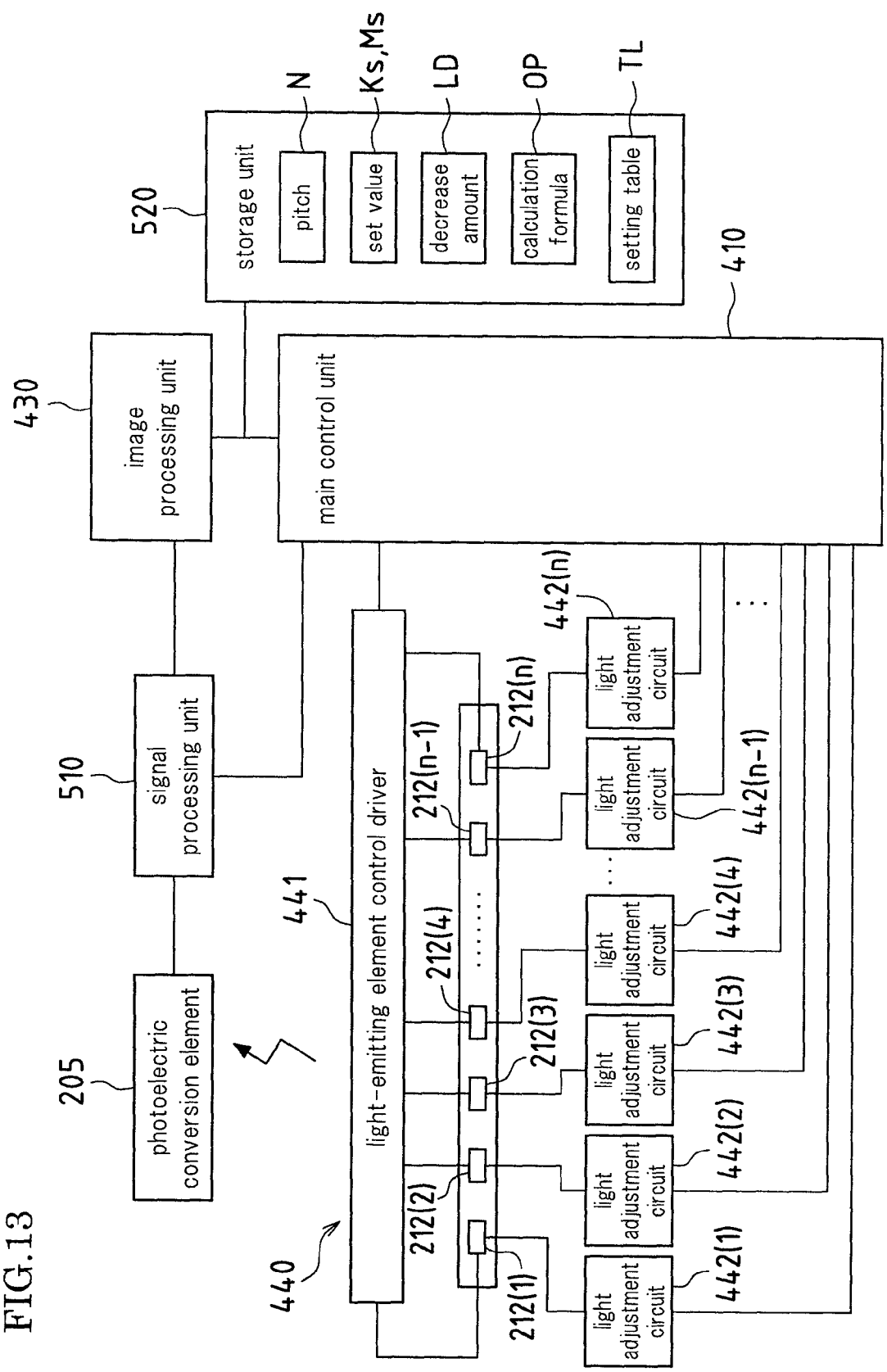
FIG. 13 shows an example in which, in the block diagram shown in FIG. 9, the output light amount from the plurality of light-emitting elements has been made separately adjustable for each of the light-emitting elements.

FIG. 13 shows an example in which, in the block diagram shown in FIG. 9, the output light amount from the plurality of light-emitting elements 212(1), . . . , 212(n) has been made separately adjustable for each of the light-emitting elements.

As shown in FIG. 13, the light amount control unit 440 is connected to the main control unit 410, and according to an instruction signal from the main control unit 410, adjusts the output light amount of each of the individual light-emitting elements 212(1), . . . , 212(n). The letter n indicates the number of light-emitting elements, and is a value of 2 or more.

Also, read values (pixel data) PX(1), . . . , PX(m) from the photoelectric conversion element 205 are associated with the plurality of light-emitting elements 212(1), . . . , 212(n). The letter m indicates the number of pixels, and is a value larger than n.

Figure 14:
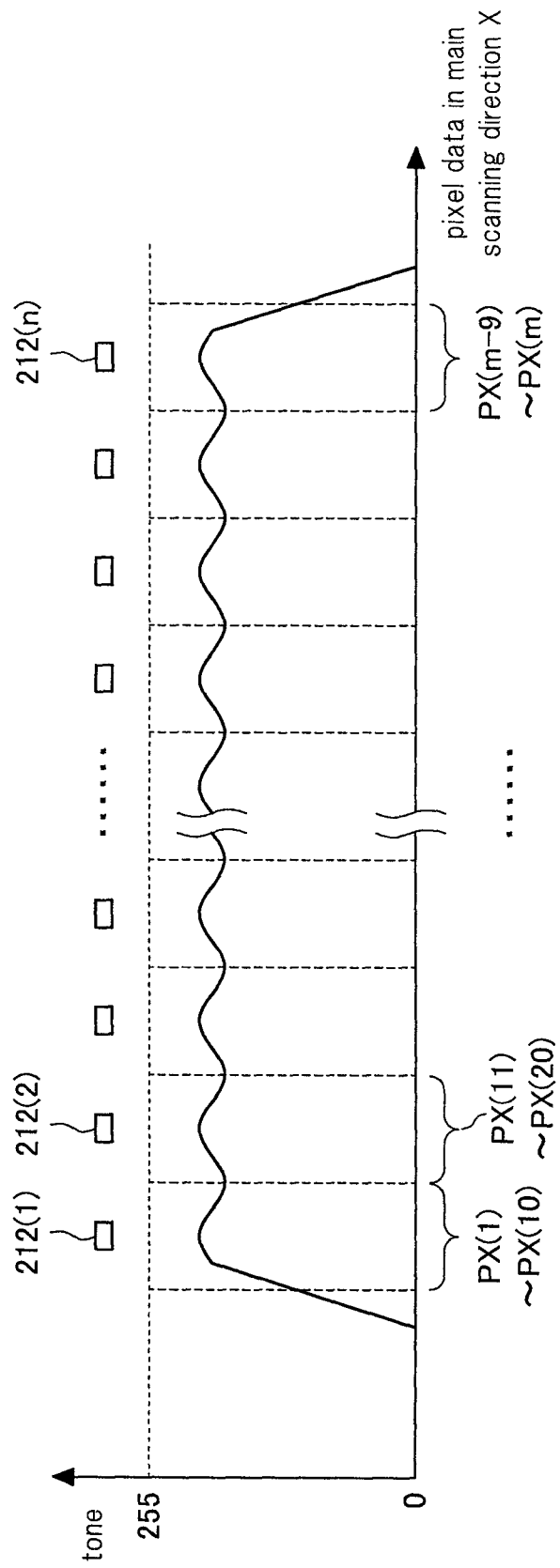
FIG. 14 shows an example in which, in the graph shown in FIG. 10, read values (pixel data) from the photoelectric conversion element have been associated with the plurality of light-emitting elements.

FIG. 14 shows an example in which, in the graph shown in FIG. 10, the read values (pixel data) PX(1), ..., PX(m) from the photoelectric conversion element 205 are associated with the plurality of light-emitting elements 212(1), ..., 212(n).

As shown in FIG. 14, the pixel data PX(1), ..., PX(m) from the photoelectric conversion element 205 are equally allocated to the individual light-emitting elements 212(1), ..., 212(n).

As shown in this example, 10 consecutive pixels are associated with a single light-emitting element 212. That is, the pixel data (PX(1) to PX(10)), pixel data (PX(11) to PX(20)), ..., and pixel data (PX(m−9) to PX(m)) are respectively associated with the light-emitting elements 212(1), 212(2), ..., 212(n). A setting table TL that shows this corresponding relationship is stored in advance in the storage unit 520 (see FIG. 13).

The light amount control unit 440 is provided with a light-emitting element control driver 441 that drives the individual light-emitting elements 212(1), ..., 212(n), and light adjustment portions (here, light adjustment circuits) 442(1), ..., 442(n) that adjust the light of the individual light-emitting elements 212(1), ..., 212(n). The light-emitting element control driver 441 and the light adjustment circuits 442(1), ..., 442(n) are connected to the main control unit 410. In the individual light-emitting elements 212(1), ..., 212(n), one terminal is connected to the light-emitting element control driver 441, and the other terminal is connected to the respective light adjustment circuits 442(1), ..., 442(n).

In this configuration, bright spot level on the light irradiation face Gd of the original G is determined for each light-emitting element from the pixel data PX(1), ..., PX(m) from the photoelectric conversion element 205, and the output light amount from the plurality of light-emitting elements 212(1), ..., 212(n) is separately adjusted for each light-emitting element based on the determination result of bright spot level.

Specifically, the calculation unit 431 calculates calculated values (slopes) K(1), ..., K(n) and calculated values (unevenness [%]) M(1), ..., M(n) for each light-emitting element (each illuminance cycle).

The determination unit 432 compares the calculated values (slopes) K(1), ..., K(n) and the calculated values (unevenness [%]) M(1), ..., M(n) calculated by the calculation unit 431 to the set values Ks and Ms stored in advance to determine the presence of bright spots on the light irradiation face Gd of the original G for each light-emitting element.

The light adjustment circuits 442(1), ..., 442(n) adjust the output light amount for each of the light-emitting elements 212(1), ..., 212(n).

The control unit 400 uses the setting table TL stored in the storage unit 520 is determine, with the determination unit 432, bright spot level on the light irradiation face Gd of the original G for each light-emitting element, and when a determination has been made that there are bright spots from the determination result of bright spot level, specifies light-emitting elements 212(i) for which there were determined to be bright spots. The letter i is a suffix of the light-emitting elements 212 for which there were determined to be bright spots and the light adjustment circuits 442 that adjust the light of those light emitting elements 212, and is a value from 1 to n.

Furthermore, the control unit 400, with the light adjustment circuits 442 (i), uses the decrease amount LD stored in the storage unit 520 to decrease the output light amount from the light-emitting elements 212(i) for which there were determined to be bright spots.

In the image reading apparatus 100 having this configuration, the output light amount from the light-emitting elements 212(1), ..., 212(n) is separately adjusted for each light-emitting element based on the determination result of determining bright spot level on the light irradiation face Gd of the original G for each light-emitting element, so bright spots can be decreased according to the output light amount from the individual light-emitting elements 212(1), ..., 212(n), and to that extent it is possible to reliably suppress uneven illuminance due to the bright spots.

Next is a separate description of a case of reading the white reference member 318 as a reference image and a case of reading a gray chart as a reference image, in an example operation to control the output light amount of light-emitting elements according to the present invention.

In the below example of control, when determined that there are bright spots from the determination result of determining bright spot level on the light irradiation face Gd of the original G for each light-emitting element, the output light amount from the light-emitting elements 212(1), ..., 212(n) is individually decreased for each light-emitting element, and to the extent of that decrease, the gain of the analog signal from the photoelectric conversion element 205 is increased.

(Reading White Reference Member 318 as Reference Image)

Figure 15:
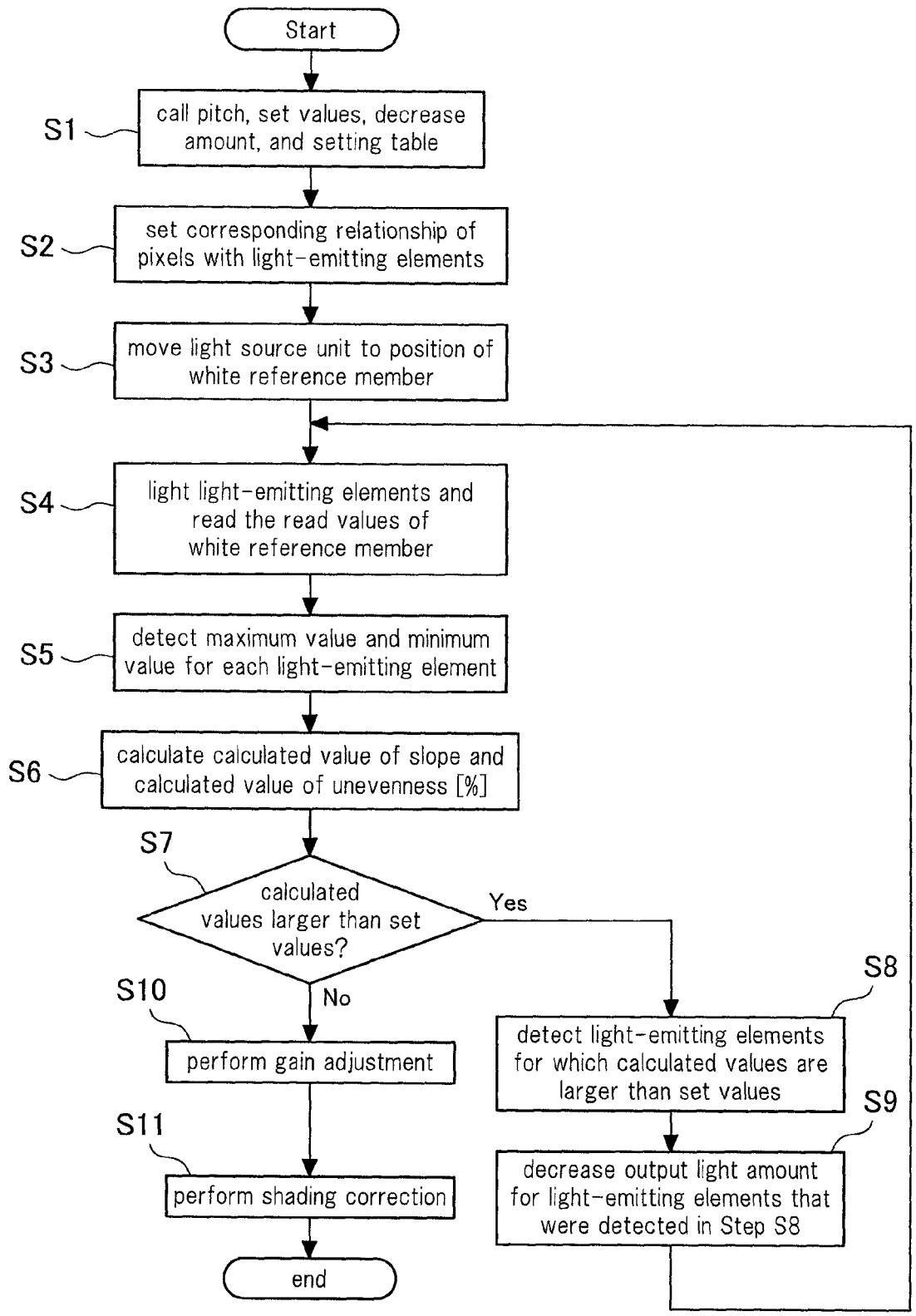
FIG. 15 is a flowchart that shows an example of control of the output light amount of the light-emitting elements according to the present embodiment, and shows a case in which a white reference member is read for a reference image.

FIG. 15 is a flowchart that shows an example of control of the output light amount of the light-emitting elements according to the present embodiment, and shows a case in which the white reference member 318 is read for a reference image.

In the control example shown in FIG. 15, the set value (slope) Ks and the set value (unevenness [%]) Ms are used as the white reference member set values to serve as a determination reference for the determination of presence of bright spots on the light irradiation face Gd of the original G.

In the control example shown in FIG. 15, first, the pitch N, the set values Ks and Ms, the decrease amount LD and the setting table TL stored in the storage unit 520 are read out (Step S1), and the corresponding relationship of the read values (pixel data) PX(1), ..., PX(m) with the light-emitting elements 212(1), ..., 212(n) is set according to the setting table TL (Step S2).

Next, if the light source unit 210 is not at the reading position V, the light source unit 210 is moved to the reading position (that is, the position of the white reference member 318) V below the original reading glass 201a by the optical system drive unit 530 (Step S3), the light-emitting elements 212(1), ..., 212(n) are lit, and the read values (pixel data) PX(1), ..., PX(m) of the white reference member 318 are read (Step S4).

A maximum value Lmax and a minimum value Lmin is detected for each light-emitting element that was set in Step S2 from the read values PX(1), ..., PX(m) that were read in Step S4 (Step S5). In Step S5, with the read values (pixel data) (PX(1) to PX(10)) and (PX(m−9) to PX(m)) that correspond to 212(1) and 212(n) on both sides among the light-emitting elements 212(1), ..., 212(n), a light-emitting element does not exist at both ends, so a minimum value is not detected for the side where a light-emitting element does not exist.

In Step S6, when performing the first calculation, from the difference amount (Lmax−Lmin) of the maximum value Lmax and the minimum value Lmin of each light-emitting element and the pitch N, the calculation unit 431 calculates the calculated value (slope) K (K(1), ..., K(n)) of the slope according to Formula (1). On the other hand, when performing the second calculation, from the difference amount (Lmax−Lmin) of the maximum value Lmax and the minimum value Lmin of each light-emitting element and Lavg (=(Lmax+Lmin)/2), the calculation unit 431 calculates the calculated value (unevenness [%]) M (M(1), ..., M(n)) of unevenness [%] according to Formula (2).

In Step S7, the calculated values K and M of each light-emitting element calculated by the calculation unit 431 are compared to the set values Ks and Ms that were stored in advance, and if there is even one light-emitting element for which the calculated values K and M are greater than the set values Ks and Ms (Step S7: Yes), then among the light-emitting elements 212(1), ..., 212(n), light emitting elements for which the calculated values K and M are greater than the set values Ks and Ms are detected (Step S8). The output light amount is decreased using the decrease amount LD for the light-emitting elements that were detected in Step S8 (Step S9), and then the control routine moves to Step S4, and the processing of Steps S4 to S9 is repeated until there is not even one light-emitting element for which the calculated values K and M are greater than the set values Ks and Ms.

On the other hand, if there is not even one light-emitting element for which the calculated values K and M are greater than the set values Ks and Ms in Step S7 (Step S7: No), then the control routine moves to Step S10 where operation in the adjustment mode is performed.

In Step S10, the white reference member 318 is read, and the gain of the analog signal from the photoelectric conversion element 205 is adjusted according to the amplification degrees Kg and Mg calculated using the calculation formula OP in the storage unit 520 from the read values PX(1), ..., PX(m) of the white reference member 318. Afterward, shading correction processing is performed in Step S11, and then processing is ended.

(Reading Gray Chart as Reference Image)

Figure 16:
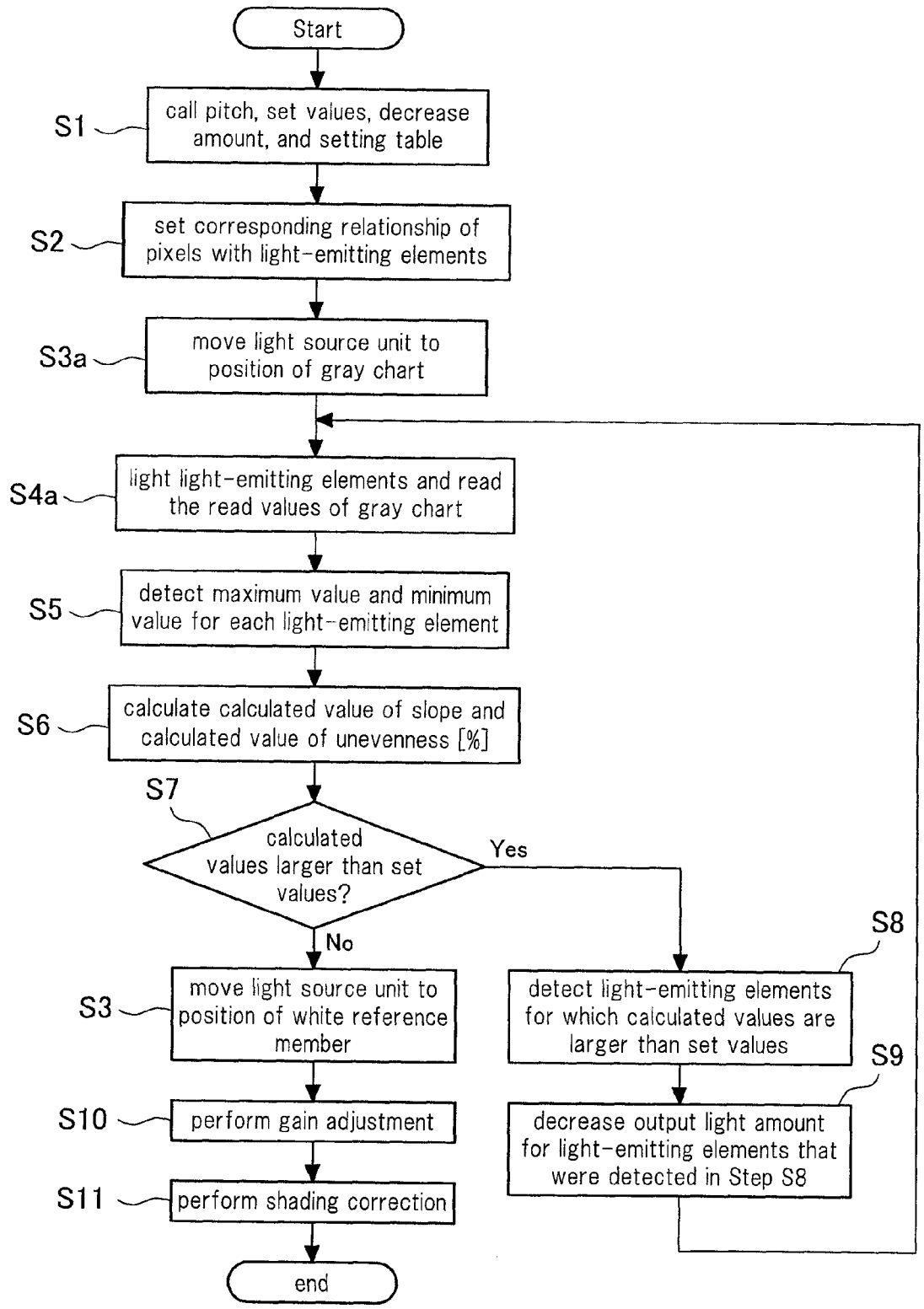
FIG. 16 is a flowchart that shows another example of control of the output light amount of the light-emitting elements according to the present embodiment, and shows a case in which a gray chart is read for a reference image.

FIG. 16 is a flowchart that shows another example of control of the output light amount of the light-emitting elements according to the present embodiment, and shows a case in which a gray chart is read for a reference image.

In the control example shown in FIG. 16, the set value (slope) Ks and the set value (unevenness [%]) Ms are used as the gray chart set values to serve as a determination reference for the determination of presence of bright spots on the light irradiation face Gd of the original G.

In this control example, a gray chart that has been transported by the automatic original feeding apparatus 300 may be read, or a gray chart that has been placed on the glass platen 201b may be read. When reading a gray chart that has been placed on the glass platen 201b, the gray chart may be read in a state in which the light source unit 210 has been stopped, or the gray chart may be read while moving the light source unit 210 to one side in the sub-scanning direction Y. In the following description, a gray chart that has been placed on the glass platen 201b is read in a state in which the light source unit 210 has been stopped.

In the control example shown in FIG. 16, Steps S3a and S4a are provided instead of Steps S3 and S4, and the processing of Step S3 in FIG. 15 is provided between Steps S7 and S10. Other processing is the same as in the flowchart shown in FIG. 15, so the same reference numbers are assigned to that processing and a description thereof is omitted here.

In Step S3a, the light source unit 210 is moved by the optical system drive unit 530 to a position (that is, the position of the gray chart) below the glass platen 201b on which the gray chart has been placed, and in Step S4a the light-emitting elements 212(1), ..., 212(n) are lit and the read values (pixel data) PX(1), ..., PX(m) of the gray chart are read.

Also, if there is not even one light-emitting element for which the calculated values K and M are greater than the set values Ks and Ms in Step S7 (Step S7: No), then the light source unit 210 is moved to the reading position (that is, the position of the white reference member 318) V below the original reading glass 201a by the optical system drive unit 530 (Step S3), and then the control routine moves to Step S10 where operation in the adjustment mode is performed.

In the above-described light amount control examples shown in FIGS. 15 and 16, if there is not even one light-emitting element for which the calculated values K and M are greater than the set values Ks and Ms, bright spots are considered to be present. The output light amount from the corresponding light-emitting elements is decreased until bright spots are considered to not be present. Thus, it is possible to suppress uneven illuminance due to the bright spots. Also, the amplification degree (here, gain of an analog signal) of the signal from the photoelectric conversion element 205 is increased with reference to the white reference member 318, so it is possible to easily compensate for inadequate strength of the signal (here, an analog signal) from the photoelectric conversion element 205 due to a decrease in the output light amount.

In the light amount control example shown in FIGS. 15 and 16, when determining that bright spots are not present, the output light amount of the light-emitting elements 212(i) may be increased until just before determining that bright spots are present. In this example, when determining that bright spots are not present, even if the output light amount of the light-emitting elements 212(i) is increased until just before determining that bright spots are present, in the adjustment mode (Step S10), it is possible to reduce the amplification degree of the signal from the photoelectric conversion element 205 to the extent that the output light amount from the light-emitting elements 212(i) was increased.

Instead of the processing in Steps S8 and S9 to decrease the output light amount of the individual light-emitting elements, processing to merely decrease the output light amount of the light-emitting elements as a whole may also be performed.

The image reading apparatus 100 according to the present embodiment may also be an equal-magnification optical system-type image reading apparatus.

The present invention may be embodied in various other forms without departing from the gist or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image reading apparatus, comprising:
a light source configured with a plurality of light-emitting elements disposed in a row in a main scanning direction that irradiate light toward an original; and
a photoelectric conversion element that receives light reflected from the original,
wherein an output light amount from the light-emitting elements can be adjusted, and
a state of bright spots due to repetition of light-dark in the main scanning direction on a light irradiation face of the original due to the plurality of light-emitting elements is determined, and the output light amount from the light-emitting elements is adjusted based on the determination result of the state of the bright spots,
wherein light is irradiated from the light-emitting elements to a reference image for detecting the state of the bright spots on the light irradiation face of the original and reflected light reflected from the reference image is read by the photoelectric conversion element, a calculated value for determining the state of the bright spots is calculated from the read value read by the photoelectric conversion element, and the calculated value is compared to a set value that has been set in advance to determine the state of the bright spots on the light irradiation face of the original.

2. The image reading apparatus according to claim 1, wherein the output light amount from the plurality of light-emitting elements can be separately adjusted for each light-emitting element, the state of the bright spots on the light irradiation face of the original is determined for each light-emitting element, and the output light amount from the plurality of light-emitting elements is separately adjusted for each light-emitting element based on the determination result of the state of the bright spots.

3. An image forming apparatus comprising an image reading apparatus according to claim 1.

4. The image reading apparatus according to claim 1, wherein a white reference member for shading correction is read for the reference image.

5. The image reading apparatus according to claim 1, wherein a gray chart is read for the reference image.

6. The image reading apparatus according to claim 1, wherein the output light amount from the light-emitting elements is decreased when determined from the determination result that the bright spots occur.

7. The image reading apparatus according to claim 6, wherein the output light amount from the plurality of light-emitting elements can be separately adjusted for each light-emitting element, the state of the bright spots on the light irradiation face of the original is determined for each light-emitting element, and the output light amount from the plurality of light-emitting elements is separately adjusted for each light-emitting element based on the determination result of the state of the bright spots.

8. An image forming apparatus comprising an image reading apparatus according to claim 6.

9. The image reading apparatus according to claim 6, wherein an amplification degree of a signal from the photoelectric conversion element is adjustable, and the amplification degree is increased to an extent that the output light amount is decreased.

10. The image reading apparatus according to claim 9, wherein the output light amount from the plurality of light-emitting elements can be separately adjusted for each light-emitting element, the state of the bright spots on the light irradiation face of the original is determined for each light-emitting element, and the output light amount from the plurality of light-emitting elements is separately adjusted for each light-emitting element based on the determination result of the state of the bright spots.

11. An image forming apparatus comprising an image reading apparatus according to claim 9.

12. The image reading apparatus according to claim 1, wherein the calculated value is calculated based on a maximum value and a minimum value of illuminance in an illuminance cycle that indicates repetition of light-dark in the main scanning direction on the light irradiation face of the original due to the plurality of light-emitting elements.

13. The image reading apparatus according to claim 12, wherein the calculated value is calculated from a change rate of an illuminance difference versus distance in the main scanning direction in the illuminance cycle.

14. The image reading apparatus according to claim 13, wherein the calculated value is set to a value calculated by below Formula (1), where the maximum value of illuminance in the illuminance cycle is Lmax, the minimum value is Lmin, and a distance between the maximum value Lmax and the minimum value Lmin in the main scanning direction is N $$(L\text{max} - L\text{min})/N \qquad \text{Formula (1)}$$

15. The image reading apparatus according to claim 12, wherein the calculated value is calculated from a change rate of an illuminance difference versus an average value of illuminance in the illuminance cycle.

16. The image reading apparatus according to claim 15, wherein the calculated value is set to a value calculated by below Formula (2), where the maximum value of illuminance in the illuminance cycle is Lmax, the minimum value is Lmin, and an average value of the maximum value Lmax and the minimum value Lmin is Lavg $$(L\text{max} - L\text{min})/L\text{avg} \qquad \text{Formula (2)}$$

* * * * *